United States Patent
Lee et al.

(10) Patent No.: US 9,603,031 B2
(45) Date of Patent: Mar. 21, 2017

(54) METHOD AND APPARATUS FOR PERFORMING HYBRID AUTOMATIC REPEAT REQUEST OPERATION IN A COMMUNICATION SYSTEM

(71) Applicant: Samsung Electronics Co. Ltd., Suwon-si, Gyeonggi-do (KR)

(72) Inventors: Ok-Seon Lee, Suwon-si (KR); Young-Bin Chang, Anyang-si (KR); Rakesh Taori, Suwon-si (KR); Yeong-Moon Son, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 307 days.

(21) Appl. No.: 13/743,889

(22) Filed: Jan. 17, 2013

(65) Prior Publication Data

US 2013/0188575 A1 Jul. 25, 2013

(30) Foreign Application Priority Data

Jan. 19, 2012 (KR) ........................ 10-2012-0006358

(51) Int. Cl.
*H04W 24/00* (2009.01)
*H04L 1/18* (2006.01)
(Continued)

(52) U.S. Cl.
CPC ........... *H04W 24/00* (2013.01); *H04L 1/1861* (2013.01); *H04B 7/26* (2013.01); *H04L 2001/0092* (2013.01); *H04W 36/08* (2013.01)

(58) Field of Classification Search
None
See application file for complete search history.

(56) References Cited

U.S. PATENT DOCUMENTS

| 7,450,543 | B2 * | 11/2008 | Laroia | H04W 36/18 |
| | | | | 370/331 |
| 2008/0068979 | A1 * | 3/2008 | Visotsky | H04L 1/1825 |
| | | | | 370/208 |

(Continued)

FOREIGN PATENT DOCUMENTS

| CN | 102197698 A | 9/2011 |
| WO | 2010/119044 A1 | 10/2010 |

(Continued)

OTHER PUBLICATIONS

Motorola, HARQ Termination Point for CoMP Joint-Transmission, 3GPP TSG-RAN-WG2 Meeting #65bis, Mar. 23-27, 2009, R2-092358.

(Continued)

*Primary Examiner* — Vinncelas Louis
(74) *Attorney, Agent, or Firm* — Jefferson IP Law, LLP

(57) ABSTRACT

A Hybrid Automatic Repeat reQuest (HARQ) method and an apparatus in a communication system are provided. The method includes receiving, by a Subscriber Station (SS), first data from at least one first member Base Station (BS) among member BSs of a cooperative cell, when the cooperative cell is configured with the member BSs to provide a communication service to the SS, generating a response signal indicating a reception result of the first data, and transmitting the response signal to at least one predefined second member BS from among the member BSs. The member BSs include a master BS for controlling communication of the member BSs and at least one slave BS for communicating with the SS under the control of the master BS.

24 Claims, 17 Drawing Sheets

(51) Int. Cl.
  *H04W 36/08* (2009.01)
  *H04B 7/26* (2006.01)
  *H04L 1/00* (2006.01)

(56) References Cited

U.S. PATENT DOCUMENTS

| | | |
|---|---|---|
| 2010/0105404 A1 | 4/2010 | Palanki et al. |
| 2010/0112957 A1* | 5/2010 | Kong et al. ............... 455/67.11 |
| 2010/0304751 A1 | 12/2010 | Ji et al. |
| 2011/0110450 A1* | 5/2011 | Gomadam ............ H04B 17/24 375/267 |
| 2011/0273999 A1* | 11/2011 | Nagaraja ..................... 370/252 |
| 2011/0317637 A1* | 12/2011 | Kim et al. ................... 370/329 |
| 2012/0163357 A1* | 6/2012 | Won ..................... H04L 1/1671 370/338 |
| 2012/0315916 A1* | 12/2012 | Van Phan ............ H04W 36/08 455/442 |
| 2013/0201841 A1* | 8/2013 | Zhang et al. ................ 370/252 |

FOREIGN PATENT DOCUMENTS

| | | |
|---|---|---|
| WO | 2010/151069 A2 | 12/2010 |
| WO | 2011/035109 A2 | 3/2011 |
| WO | 2011/100673 A1 | 8/2011 |

OTHER PUBLICATIONS

Fujitsu, UL CoMP HARQ Processing, 3GPP TSG-RAN WG2 Meeting #66, May 4-8, 2009, pp. 1-4, R2-093078.

Alcatel-Lucent Shanghai Bell et al., Impact of UL CoMP to HARQ Operations, 3GPP TSG RAN WG2 Meeting #65bis, Mar. 23-27, 2009, R2-092196.

Alcatel-Lucent Shanghai Bell et al., Impact of UL CoMP to HARQ Operations, 3GPP TSG RAN WG2 Meeting #66bis, Jun. 29-Jul. 3, 2009, R2-093818.

Fujitsu, UL CoMP HARQ Processing, 3GPP TSG-RAN WG2 Meeting #66bis, Jun. 29-Jul. 3, 2009, pp. 1-4, R2-093958.

ZTE, A Few Considerations for Inter-eNB CoMP, 3GPP TSG RAN WG2 Meeting #66, May 4-8, 2009, R2-093139.

* cited by examiner

METHOD AND APPARATUS FOR PERFORMING HYBRID AUTOMATIC REPEAT REQUEST OPERATION IN A COMMUNICATION SYSTEM

PRIORITY

This application claims the benefit under 35 U.S.C. §119(a) of a Korean patent application filed in the Korean Intellectual Property Office on Jan. 19, 2012 and assigned Serial No. 10-2012-0006358, the entire disclosure of which is hereby incorporated by reference.

BACKGROUND OF THE INVENTION

1. Field of the Invention

The present invention relates to a method and an apparatus for performing a Hybrid Automatic Repeat reQuest (HARQ) operation in a wireless communication system. More particularly, the present invention relates to a method for performing a HARQ retransmission in a cooperative cell-based communication system including a master Base Station (BS) and at least one slave BS that provide a communication service to a Subscriber Station (SS) in cooperation with each other.

2. Description of the Related Art

A wireless communication system using a high frequency band, such as MilliMeter Waves (MMW), is under consideration as a future-generation wireless communication system in order to support a large-amount of data service. In the high-frequency system, the communication available distance between a SS and a BS is decreased. The decrease in the cell radiuses of BSs leads to an increase in the number of BSs installed to secure service coverage for SSs. Due to a decrease in the cell radiuses of BSs and an increase in the number of BSs, the number of inter-cell handovers is increased in the aspect of the mobility of the SSs. Consequently, system overhead increases.

Because the number of BSs per unit area is increased in the high-frequency wireless communication system, a serving BS communicating with an SS is changed frequently during the SS's movement. Accordingly, a need exists for an efficient retransmission method between a BS and an SS, reflecting the frequent change of a serving BS.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide a method and an apparatus for performing a Hybrid Automatic Repeat reQuest (HARQ) retransmission in a cooperative cell-based communication system including a master Base Station (BS) and at least one slave BS that provide a communication service to a Subscriber Station (SS) in cooperation with each other.

In accordance with an aspect of the present invention, a HARQ method of an SS in a communication system is provided. The method includes receiving first data from at least one first member BS among member BSs of a cooperative cell, when the cooperative cell is configured with the member BSs to provide a communication service to the SS, and generating a response signal indicating a reception result of the first data and transmitting the response signal to at least one predefined second member BS from among the member BSs. The member BSs include a master BS for controlling communication of the member BSs and at least one slave BS for communicating with the SS under the control of the master BS.

In accordance with another aspect of the present invention, a HARQ method in a communication system is provided. The method includes, when a cooperative cell is configured with member BSs to provide a communication service to an SS, transmitting first data to the SS by each of first member BSs among the member BSs of a cooperative cell, and receiving, by at least one second member BS among the member BSs, a response signal indicating a reception result of the first data from the SS and determining whether the first data is to be retransmitted based on the response signal. The member BSs include a master BS for controlling communication of the member BSs and at least one slave BS for communicating with the SS under the control of the master BS.

In accordance with another aspect of the present invention, an SS for performing HARQ in a communication system is provided. The SS includes a transceiver for receiving first data from at least one first member BS among member BSs of a cooperative cell, when the cooperative cell is configured with the member BSs to provide a communication service to the SS, and a controller for generating a response signal indicating a reception result of the first data and controlling the transceiver to transmit the response signal to at least one predefined second member BS from among the member BSs.

In accordance with another aspect of the present invention, an apparatus for performing HARQ in a communication system is provided. The apparatus includes first member BSs, among member BSs of a cooperative cell, which transmit first data to an SS when the cooperative cell is configured with the member BSs to provide a communication service to the SS, and at least one second member BS, among the member BSs, which receives a response signal indicating a reception result of the first data from the SS and determines whether the first data is to be retransmitted based on the response signal. The member BSs include a master BS for controlling communication of the member BSs and at least one slave BS for communicating with the SS under the control of the master BS.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, the same drawing reference numerals will be understood to refer to the same elements, features and structures.

DETAILED DESCRIPTION OF EXEMPLARY EMBODIMENTS

Figure 1:
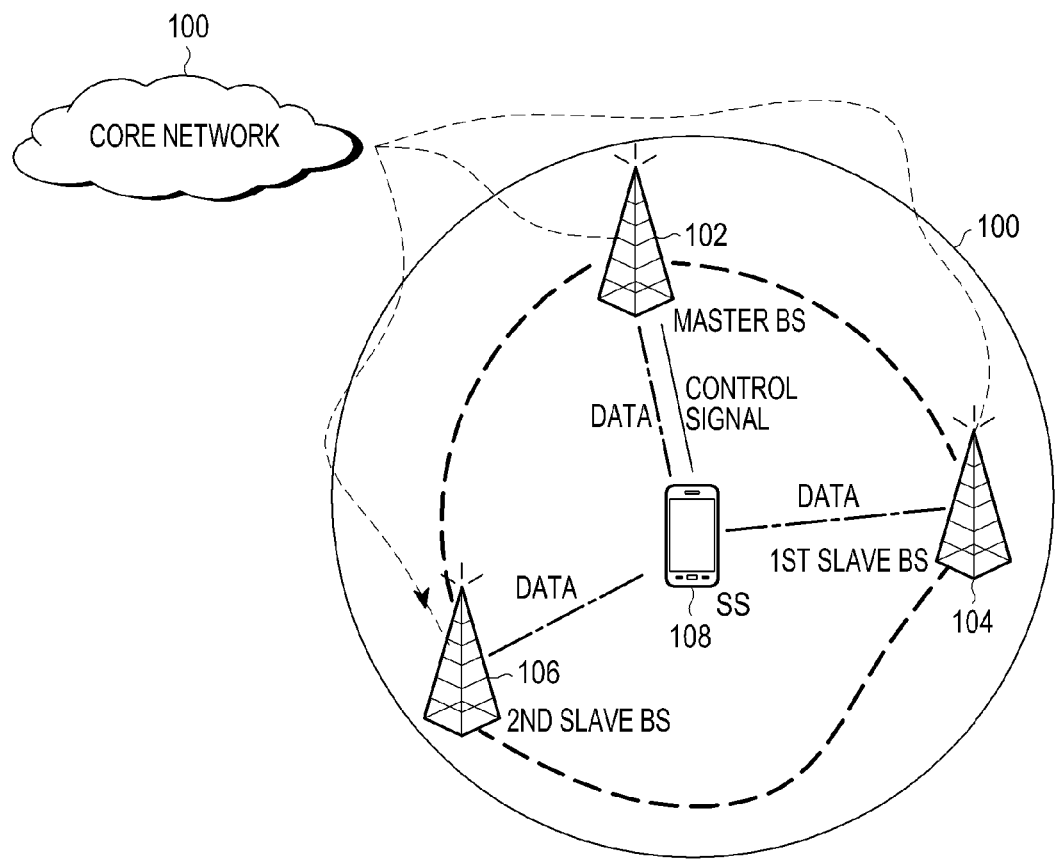
FIG. 1 illustrates a configuration of a cooperative cell according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

An exemplary embodiment of the present invention provides a Hybrid Automatic Repeat reQuest (HARQ) method and apparatus in a cooperative cell-based communication system including member Base Stations (BSs) that serve one Subscriber Station (SS) in cooperation with one another in order to provide an efficient service to users, taking into account the characteristics of high-frequency bands to be used in a future-generation communication system. In exemplary embodiments of the present invention, a cooperative cell refers to a virtual cell including a plurality of BSs that provide a service to one SS. For example, while the cooperative cell operates in MilliMeter Waves (MMW), it may also operate in other frequency bands.

FIGS. 1 through 12B, discussed below, and the various exemplary embodiments used to describe the principles of the present disclosure in this patent document are by way of illustration only and should not be construed in any way that would limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the invention. Terms first, second, and the like are used to differentiate between objects having the same terminology and are in no way intended to represent a chronological order, unless where explicitly stated otherwise. A set is defined as a non-empty set including at least one element.

FIG. 1 illustrates a configuration of a cooperative cell according to an exemplary embodiment of the present invention.

Referring to FIG. 1, a cooperative cell 100 may include an SS 108 and three member BSs 102, 104, and 106 for transmitting data to the SS 108. In FIG. 1, the three member BSs 102, 104, and 106 form the cooperative cell 100.

However, it is to be noted that the number of member BSs in a cooperative cell may vary.

The master BS 102 may transmit both a control signal and data to the SS 108 and manage the other BSs, for example, the first and second slave BSs 104 and 106. Unless the first and second slave BSs 104 and 106 receive any specific command from the master BS 102, they can transmit only data to the SS 108. However, the slave BSs 104 and 106 may transmit control information to the SS 108, when commanded by the master BS 102. The master BS 102 and the first and second slave BSs 104 and 106 may transmit the same data or different data to the MS 108.

For example, the master BS 102 may be connected directly to the first and second slave BSs 104 and 106, wirelessly or through a wire.

Since the master BS 102 and the first and second slave BSs 104 and 106 serve the SS 108 together, the reliability of weak links can be increased. In addition, as the master BS 102 and the first and second slave BSs 104 and 106 provide a plurality of good links to the SS 108, data throughput can be increased. The cooperative cell 100 is configured for the purpose of providing a high-speed service to the SS 108. Even though the SS 108 is not located at a cell edge, the cooperative cell 100 can be configured for the SS 108.

The master BS 102 and the first and second slave BSs 104 and 106 may transmit data to the SS 108 simultaneously or at different time points in the cooperative cell 100. Similarly, the SS 108 may transmit data to the master BS 102 and the first and second slave BSs 104 and 106 simultaneously or at different time points. For this purpose, the SS 108 may have multiple Radio Frequency (RF) chains.

The cooperative cell 100 may be reconfigured according to the communication states between the SS 108 and the BSs 102, 104 and 106. For example, when the SS 108 experiences a continuous delay in communication with a specific BS, the BS may be removed from the cooperative cell 100. If any neighboring BS in a good channel state equal to or larger than a threshold is found according to channel measurements of neighboring BSs of the SS 108, the neighboring BS may join as a new member of the cooperative cell 100.

Therefore, the communication states of the SS 108 and the BSs 102, 104, and 107 need continuous monitoring to efficiently operate the cooperative cell 100. For this purpose, upon receipt of data, the SS 108 transmits a feedback for the received data to all member BSs that have transmitted the data so that the member BSs may be aware of the channel states between the SS 108 and the member BSs. If any member BS fails to receive the feedback or receives a Negative ACKnowledgement (NACK) signal indicating reception failure of the data, the member BS needs to retransmit the data. The following description is given of a case where, when a device fails to receive data, the device transmits a NACK signal. However, if a member BS has not received an ACK signal for a predefined time, the member BS needs to retransmit data, considering that the non-reception of an ACK signal is equivalent to reception of a NACK signal. Similarly, upon receipt of data from the SS 108, member BSs in the cooperative cell 100 should transmit feedbacks to the SS 108. For efficient retransmission during data transmission and reception between an SS and member BSs in a cooperative cell, an exemplary embodiment of the present invention provides specific Downlink (DL) HARQ and Uplink (UL) HARQ operations.

1. DL HARQ Operations

Exemplary embodiments of the present invention regarding DL data transmission, that is, data transmission from member BSs to an SS in a cooperative cell, will be described separately based on the following conditions. Specifically, the exemplary embodiments of the present invention are differentiated depending on the number of member BSs transmitting data, depending on whether a plurality of member BSs transmit the same data or different data, depending on whether reception results of data from member BSs are represented in a single Acknowledgement/Negative acknowledgement (ACK/NACK) signal (hereinafter, referred to as 'A/N signal'), depending on whether A/N signals or an A/N map are generated to indicate reception results of data for the respective transmitting member BSs, and depending on the number of member BSs receiving an A/N signal or A/N signals. An A/N signal and an A/N bitmap may be collectively referred to as response signals.

<Exemplary Embodiment 1>

According to a first exemplary embodiment of the present invention, when one BS transmits data to an SS in a cooperative cell, one of member BSs in the cooperative cell is set as an A/N receiving BS that will receive an A/N signal indicating the reception result of the data from the SS. A master BS or a slave BS selected by the master BS may be set as the A/N receiving BS. Herein, a HARQ operation under the control of a master BS (i.e., central control) and a HARQ operation under the control of a master BS and another member BS (i.e., hybrid control) will be described separately.

Figure 2A:
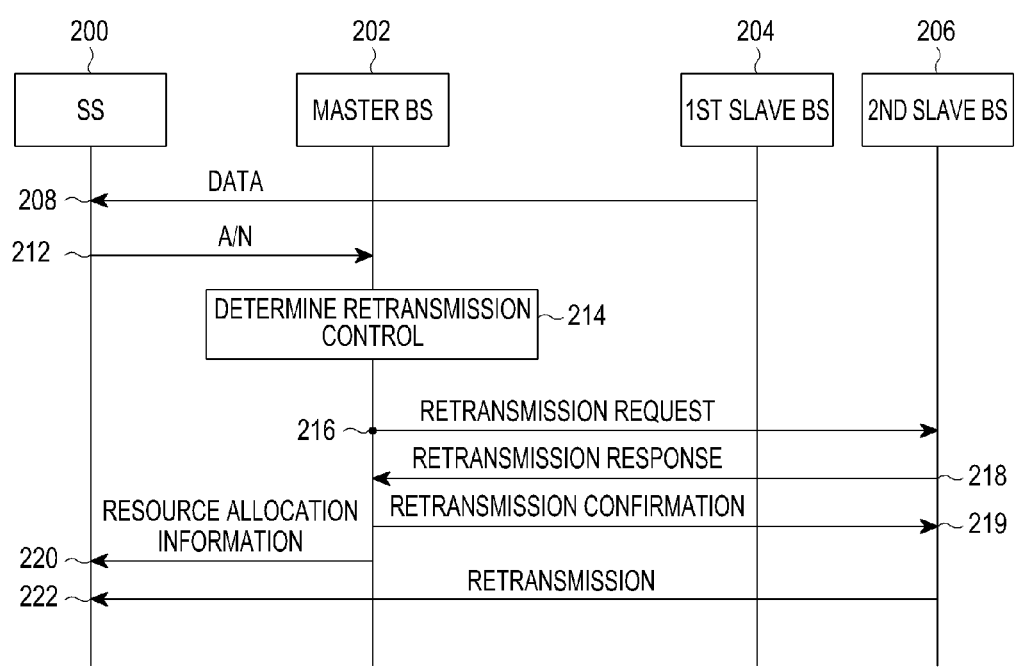
FIG. 2A illustrates a signal flow for performing a Hybrid Automatic Repeat reQuest (HARQ) operation under central control according to a first exemplary embodiment of the present invention.

FIG. 2A illustrates a signal flow for performing a HARQ operation under central control according to the first exemplary embodiment of the present invention.

Referring to FIG. 2A, a cooperative cell includes member BSs that serve an SS 200, that is, a master BS 202 and first and second slave BSs 204 and 206.

The first slave BS 204 transmits data to the SS 200 in step 208. In step 212, the SS 200 transmits an A/N signal indicating the reception result of the data received from the first slave BS 204 to a predefined BS, for example, the master BS 202. Herein, it is assumed that the A/N signal is a NACK signal indicating failure of data reception. The master BS 202 determines to control data retransmission to the SS 200 in step 214. The master BS 202 may select, as a BS to retransmit the data to the SS 200 (referred to as a retransmitting BS), a BS having a high ACK reception rate for a predefined time period, a BS in a good channel state as indicated by a channel measurement report of the SS 200, or a BS having a low cell load from among the member BSs of the cooperative cell including the master BS 202. For example, the master BS 202 selects the second slave BS 206 as the retransmitting BS in the illustrated case of FIG. 2A. Subsequently, the master BS 202 transmits a retransmission request to the second slave BS 206 in step 216. Upon receipt of the retransmission request, the second slave BS 206 determines whether to accept the retransmission request through grant control based on its available resources and cell load and transmits a retransmission response including the determination result to the master BS 202 in step 218. The retransmission request includes at least one of the Identifier (ID) of the SS to which the data is to be retransmitted, the amount of retransmission data, and information about the Quality of Service (QoS) of the retransmission data. The retransmission response includes resource allocation information for retransmission.

If the determination result acquired from the retransmission response indicates 'accept' for the retransmission request, the master BS 202 transmits a retransmission confirmation to the second slave BS 206 in step 219.

In step 220, the master BS 202 transmits the resource allocation information acquired from the retransmission response to the SS 200.

The second slave BS 206 retransmits the data to the SS 200 according to the resource allocation information in step 222.

Consequently, retransmission of the data transmitted in step 208 is controlled by the master BS 202.

Figure 2B:
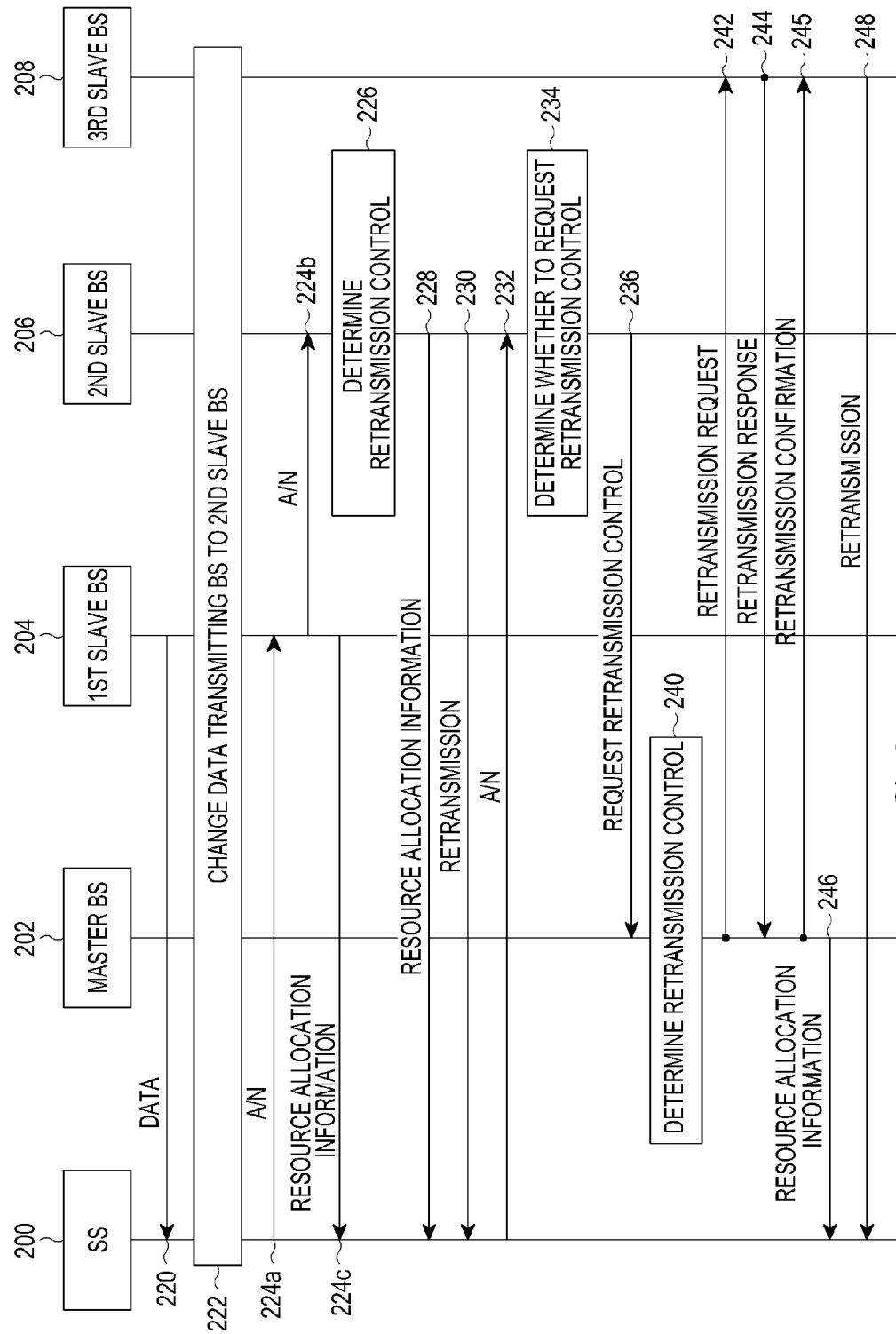
FIG. 2B illustrates a signal flow for performing a HARQ operation under hybrid control according to the first exemplary embodiment of the present invention.

FIG. 2B illustrates a signal flow for performing a HARQ operation under hybrid control according to the first exemplary embodiment of the present invention.

Referring to FIG. 2B, the cooperative cell includes member BSs that serve the SS 200, that is, the master BS 202, the first slave BS 204, the second slave BS 206, and a third slave BS 208. It is assumed herein that the second slave BS 206 receiving an A/N signal from the SS 200 among the member BSs of the cooperative cell controls data retransmission to the SS 200.

The first slave BS 204 transmits data to the SS 200 in step 220. It is assumed that a transmitting BS that will transmit data to the SS 200 is changed from the first slave BS 204 to the second slave BS 206 according to a resource allocation result of the master BS 202 in step 222.

In step 224a, the SS 200 transmits an A/N signal indicating the reception result of the data received from the first slave BS 204 to a predefined BS. For example, the SS 200 is supposed to transmit the A/N signal to the first slave BS 204 that has initially transmitted the data to the SS 200.

Because the transmitting BS has been changed to the second slave BS 206, the first slave BS 204 forwards the A/N signal to the second slave BS 206 in step 224b. In addition, the first slave BS 204 transmits resource allocation information to the SS 200, indicating that the transmitting BS has been changed from the first slave BS 204 to the second slave BS 206 in step 224c. The A/N signal is assumed to be a NACK signal. The second slave BS 206 that has received the NACK signal determines data retransmission to the SS 200 and allocates resources for the retransmission in step 226. Available resources of the second slave BS 206 are allocated as the retransmission resources. The second slave BS 206 transmits information about the allocated resources to the SS 200 in step 228 and retransmits the data to the SS 200 using the allocated resources in step 230.

In step 232, the SS 200 transmits an A/N signal indicating the reception result of the retransmission data to the second slave BS 206. The A/N signal is also assumed to be a NACK signal herein. The second slave BS 206 determines whether it is capable of data retransmission to the SS 200 and determines whether to transmit a request for controlling data retransmission to the SS 200 to the master BS 200 according to the determination result in step 234. Specifically, the second slave BS 206 compares the number of NACK signals successively received from the SS 200 for a predefined time period or determines its available resource state. If the number of NACK signals exceeds a threshold or the available resources of the second slave BS 206 are not sufficient for additional retransmission, the second slave BS 206 determines to request the master BS 202 to control data retransmission to the SS 200. In step 236, the second slave BS 206 transmits a retransmission control request to the master BS 202. The master BS 202 selects a BS that will allocate resources for data retransmission to the SS 200, taking into account cell load and channel state in step 240. In the illustrated case of FIG. 2B, the master BS 202 selects the third slave BS 208 as a retransmitting BS. The master BS 202 transmits a retransmission request to the third slave BS 208 in step 242. The retransmission request includes the ID of the SS 200 to which the data is to be retransmitted, the amount of retransmission data, and information about the QoS of the retransmission data. Upon receipt of the retransmission request, the third slave BS 208 determines whether it can allocate resources for the data retransmission through grant control and transmits a retransmission response including the determination result to the master BS 202 in step 244. The retransmission response includes resource allocation information for the data retransmission.

If the determination result acquired from the retransmission response indicates 'accept' for the retransmission request, the master BS 202 transmits a retransmission confirmation to the third slave BS 208 in step 245.

In step 246, the master BS 202 transmits resource allocation information to the SS 200. The resource allocation information further includes information about the retransmitting BS, that is, information about the third slave BS 208.

The third slave BS 208 retransmits the data to the SS 200 in step 248. Consequently, retransmission of the data transmitted in step 220 is controlled by the master BS 202 and the third slave BS 208.

<Exemplary Embodiment 2>

According to a second exemplary embodiment of the present invention, when a plurality of member BSs transmit the same data to an SS, the SS generates a single A/N signal indicating the reception result of the same data irrespective of the number of the member BSs that have transmitted the same data. Specifically, because the SS receives the same data from the member BSs, if the same data has been successfully received from at least one of the member BSs, the SS generates an ACK signal as the reception result of the same data. If the SS fails to receive the same data from any of the member BSs, the SS generates a NACK signal as the reception result of the data. Alternatively, the SS may obtain a final reception result by decoding the received data. A case where a single member BS (i.e., a single A/N receiving BS) is set to receive an A/N signal from an SS and a case where all member BSs that have transmitted data to an SS are set as A/N receiving BSs will be described separately.

Figure 3A:
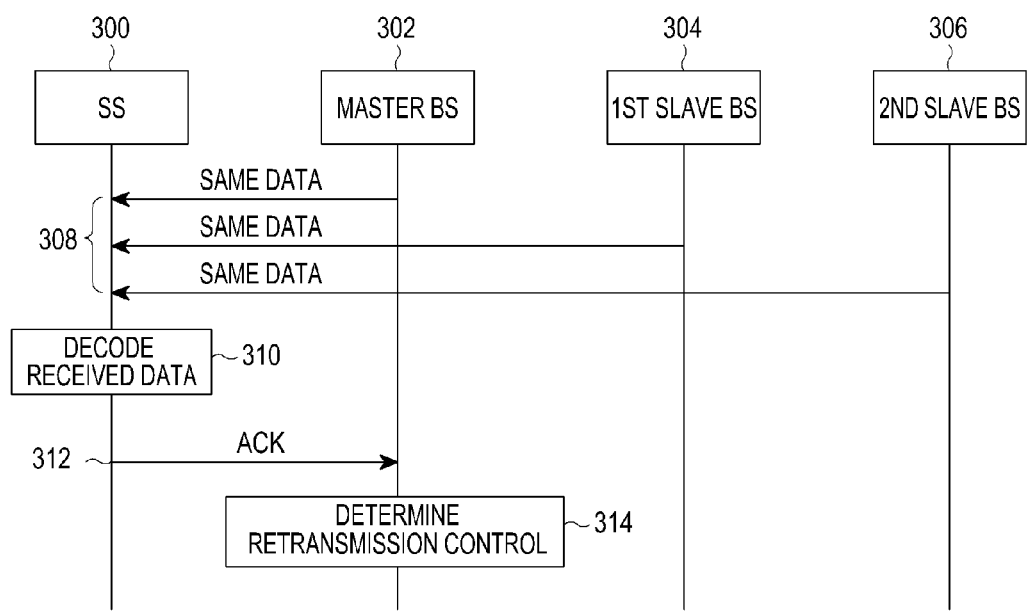
FIGS. 3A and 3B illustrate signal flows for performing a HARQ operation in a case where one Base Station (BS) is set to receive an Acknowledgement/Negative acknowledgement (A/N) signal according to a second exemplary embodiment of the present invention.
Figure 3B:
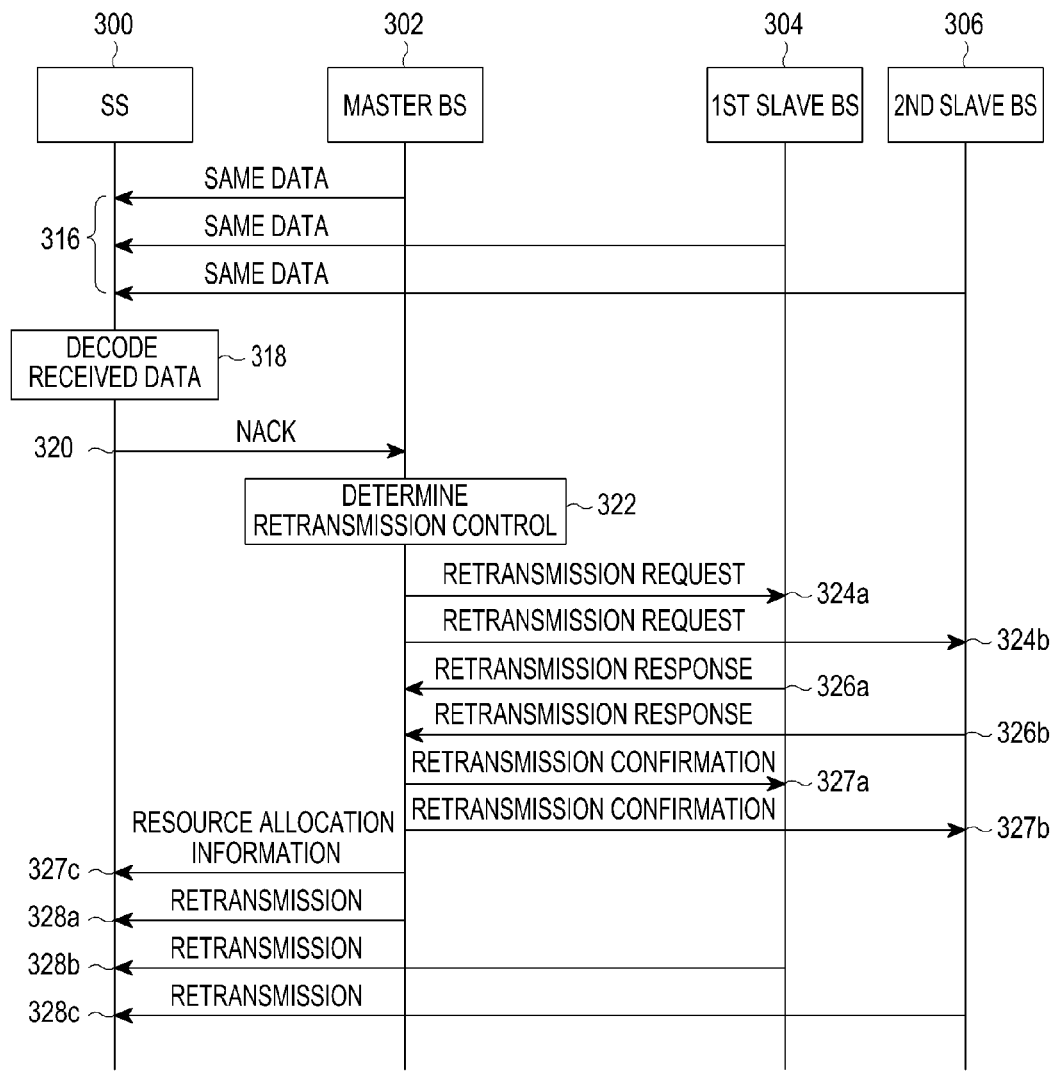

FIGS. 3A and 3B illustrate signal flows for performing a HARQ operation in a case where one A/N receiving BS is set according to the second exemplary embodiment of the present invention. FIG. 3A describes a case where an A/N signal is an ACK signal and FIG. 3B describes a case where the A/N signal is a NACK signal.

Referring to FIG. 3A, a cooperative cell includes a master BS 302, a first slave BS 304, and a second slave BS 306 to serve an SS 300. It is assumed that the master BS 302 is set as an A/N receiving BS and performs central control on a HARQ operation. If one of the first and second BSs 304 and 306 is set as an A/N receiving BS, the A/N receiving BS should forward an A/N signal received from the SS 200 to the master BS 302, for the central control of the master BS 302.

In step 308, the master BS 302, the first slave BS 304, and the second slave BS 306 transmit the same data to the SS 300. The master BS 302, the first slave BS 304, and the second slave BS 306 may transmit the data to the SS 300 at the same time or at different time points.

The SS 300 decodes the same data received from the master BS 302, the first slave BS 304, and the second slave BS 306 and generates one ACK or NACK signal as the reception result of the same data based on the respective reception results of the data from the master BS 302, the first slave BS 304, and the second slave BS 306 in step 310. Herein, it is assumed that the SS 300 has received the same data successfully from at least one of the master BS 302, the first slave BS 304, and the second slave BS 306. The SS 300 then generates one ACK signal as the reception result of the same data received in step 308. The SS 300 transmits the ACK signal to the master BS 302 in step 312.

The master BS 302 does not retransmit the same data because it has received the ACK signal from the SS 300 in step 314.

Referring to FIG. 3B, the master BS 302, the first slave BS 304, and the second slave BS 306 transmit the same data to the SS 300 in step 316. The SS 300 decodes the same data received from the master BS 302, the first slave BS 304, and the second slave BS 306 and generates one ACK or NACK signal as the reception result of the same data based on the respective reception results of the data from the master BS 302, the first slave BS 304, and the second slave BS 306 in step 318. Herein, it is assumed that the SS 300 has not received the same data from any of the master BS 302, the first slave BS 304, and the second slave BS 306. The SS 300 then generates one NACK signal as the reception result of the same data received in step 316 and transmits the NACK signal to the master BS 302 in step 320.

The master BS 302 determines to control retransmission of the same data because it has received the NACK signal from the SS 300 in step 322.

The master BS 302 transmits a retransmission request to both the first and second slave BSs 304 and 306 in steps 324a and 324b. The retransmission request includes at least one of the ID of the SS 300 to which the data is to be retransmitted, the amount of retransmission data, and information about the QoS of the retransmission data.

Upon receipt of the retransmission request, the first and second slave BSs 306 and 308 transmit retransmission responses to the master BS 302 in steps 326a and 326b, respectively. Each of the retransmission responses includes resource allocation information for retransmission. The master BS 302 transmits a retransmission confirmation to both the first and second slave BSs 304 and 306 based on results of the retransmission response in steps 327a and 327b. The master BS 302 transmits resource allocation information for retransmission to the SS 300 in step 327c.

If the retransmission responses indicate that the data transmitted in step 316 can be retransmitted, the master BS 302, the first slave BS 304, and the second slave BS 306 retransmit the same data, as transmitted in step 316 to the SS 300, in steps 328a, 328b, and 328c, respectively.

While not illustrated in FIG. 3B, if the retransmission responses that the master BS 302 has received from the first and second slave BSs 304 and 306 indicate that the data transmitted in step 316 cannot be retransmitted, the master BS 302 transmits a retransmission request to another slave BS in the cooperative cell or retransmits the data using its resources.

While all of member BSs causing a NACK signal retransmit data in FIG. 3B, in an alternative exemplary embodiment, the master BS 302 can select one or more retransmitting BSs from among the member BSs.

Figure 4:
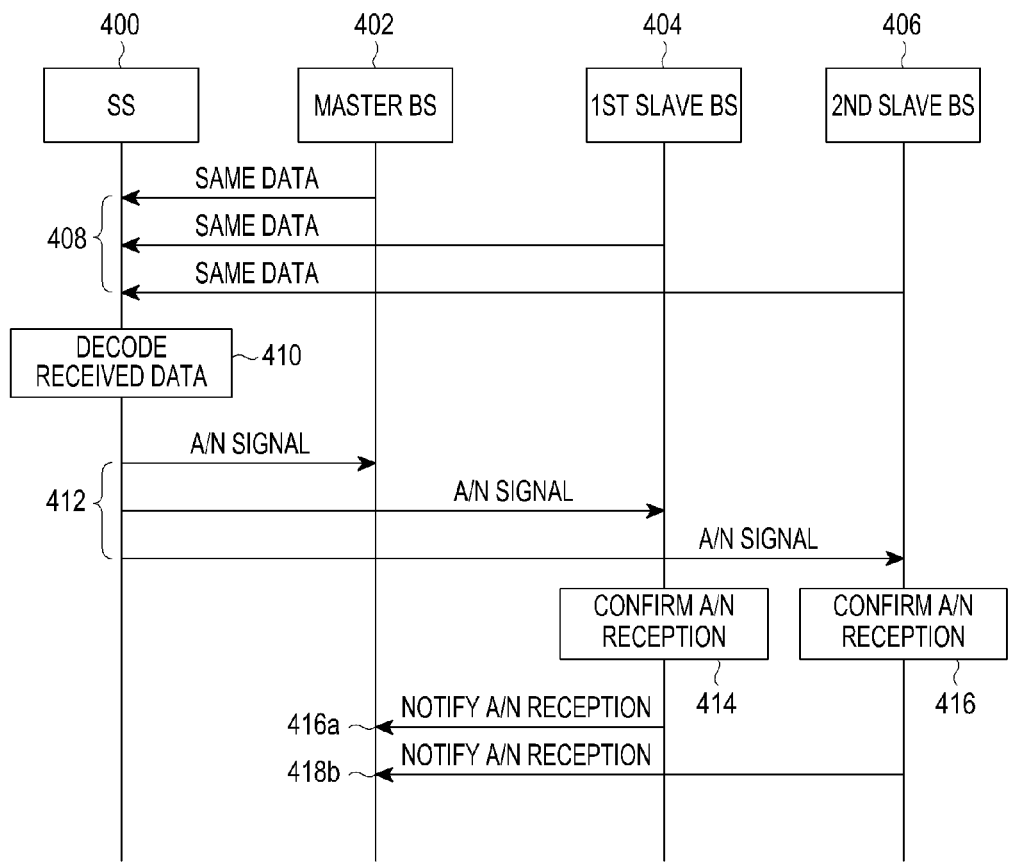
FIG. 4 illustrates a signal flow for performing a HARQ operation in a case where a plurality of BSs are set to receive an A/N signal according to the second exemplary embodiment of the present invention.

FIG. 4 illustrates a signal flow for performing a HARQ operation in a case where a plurality of BSs are set to receive an A/N signal according to the second exemplary embodiment of the present invention.

Referring to FIG. 4, a cooperative cell includes a master BS 402, a first slave BS 404, and a second slave BS 406 to serve an SS 400. It is assumed that the master BS 402, the first slave BS 404, and the second slave BS 406 are all set as A/N receiving BSs. In alternative exemplary embodiments, a part of the member BSs may be set as A/N receiving BSs.

In step 408, the master BS 402, the first slave BS 404, and the second slave BS 406 transmit the same data to the SS 400. The master BS 402, the first slave BS 404, and the second slave BS 406 may transmit the data to the SS 400 at the same time or at different time points.

The SS 400 decodes the same data received from the master BS 402, the first slave BS 404, and the second slave BS 406 and generates one ACK or NACK signal as the reception result of the same data based on the respective reception results of the data from the master BS 402, the first slave BS 404, and the second slave BS 406 in step 410. As done in FIGS. 3A and 3B, if the SS 300 has received the same data successfully from at least one of the master BS 402, the first slave BS 404, and the second slave BS 406, the SS generates one ACK signal as the reception result of the same data received in step 408. On the contrary, if the SS has not received the same data from any of the master BS 402, the first slave BS 404, and the second slave BS 406, the SS 400 generates one NACK signal as the reception result of the same data received in step 408. For example, the A/N signal generated in step 410 is a single ACK or NACK signal that does not specify the transmitting BSs separately.

The SS 300 transmits the A/N signal to the master BS 402, the first slave BS 404, and the second slave BS 406 in step 412.

The first and second slave BSs 404 and 406 confirm reception of the A/N signal in steps 414 and 416, respectively, and notify the master BS 402 of the reception of the A/N signal in steps 416a and 416b, respectively.

Subsequently, the master BS 402 determines whether to retransmit the data in the same manner as in FIG. 3A. For example, the master BS 402 determines its received A/N signal and the A/N signals received at the first and second slave BSs 404 and 406. If at least one of the A/N signals is an ACK signal, the master BS 402 does not retransmit the same data. On the other hand, if all of the A/N signals are NACK signals or at least one ACK signal has not been received for a predefined time, the master BS 402 determines to control retransmission of the data and performs data retransmission control.

<Exemplary Embodiment 3>

According to a third exemplary embodiment of the present invention, when a plurality of BSs transmit the same data to an SS, the SS generates an A/N signal indicating the reception results of the data for the respective BSs. Specifically, the A/N signal may include a plurality of A/N signals each indicating the reception result of data received from one of the BSs or an A/N bitmap corresponding to the A/N signals is generated. A/N signal transmission is considered in three cases: one is that the A/N signal is transmitted to all of the BSs that have transmitted the same data, another is that the A/N signal is transmitted only to a predefined A/N receiving BS, and the other is that the A/N signal is transmitted to a plurality of selected A/N receiving BSs.

Figure 5A:
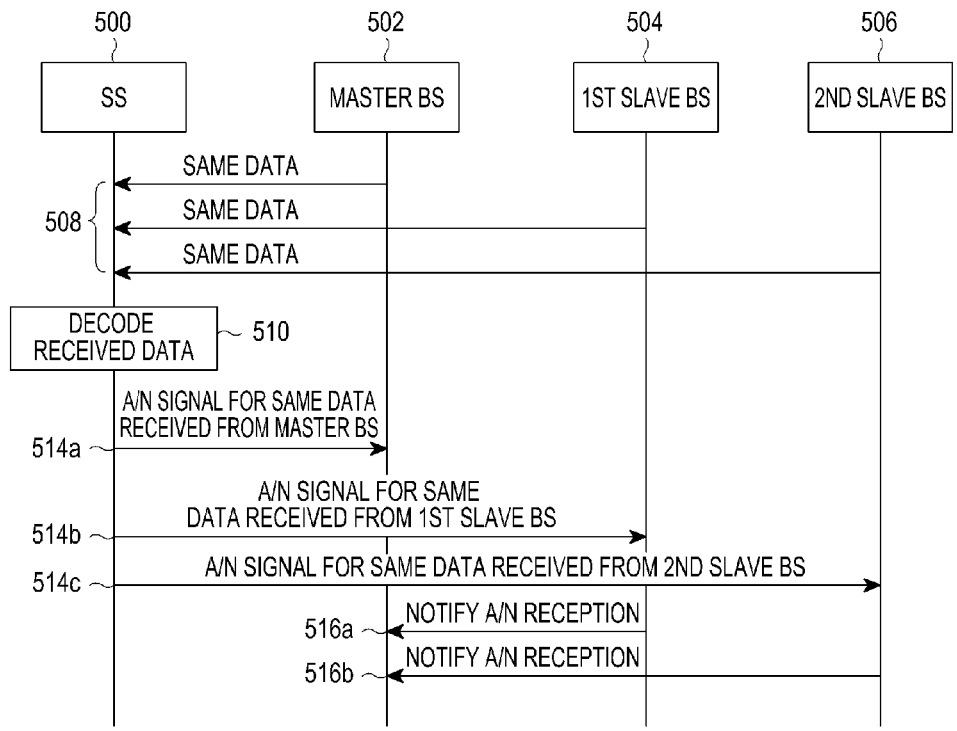
FIG. 5A illustrates a signal flow for performing a HARQ operation in a case where A/N signals are transmitted to all member BSs that have transmitted same data according to a third exemplary embodiment of the present invention.

FIG. 5A illustrates a signal flow for performing a HARQ operation in a case where A/N signals are transmitted to all member BSs that have transmitted same data according to the third exemplary embodiment of the present invention.

Referring to FIG. 5A, a cooperative cell includes a master BS 502, a first slave BS 504, and a second slave BS 506 to serve an SS 500. The master BS 502, the first slave BS 504, and the second slave BS 506 transmit the same data to the SS 500 in step 508. The master BS 502, the first slave BS 504, and the second slave BS 506 may transmit the data to the SS 500 at the same time or at different time points.

The SS 500 decodes the same data received from the master BS 502, the first slave BS 504, and the second slave BS 506 and generates an A/N signal or A/N bitmap indicating reception results for the respective transmitting BSs in step 510.

The SS 500 transmits the A/N signal for the same data received from the master BS 502 to the master BS 502 in step 514a, transmits the A/N signal for the same data received from the first slave BS 504 to the first slave BS 504 in step 514b, and transmits the A/N signal for the same data received from the second slave BS 506 to the second slave BS 506 in step 514c.

The first and second slave BSs 504 and 506 notify the master BS 502 that they have received the A/N signals for the transmitted same data from the SS 500, in steps 516a and 516b, respectively.

While not shown, the master BS 502 determines its received A/N signal and the A/N signals received at the first and second slave BSs 504 and 506. If at least one of the A/N signals is an ACK signal, the master BS 502 does not retransmit the same data transmitted in step 508. On the other hand, if all of the A/N signals are NACK signals, the master BS 502 determines to control retransmission of the data transmitted in step 508.

Figure 5B:
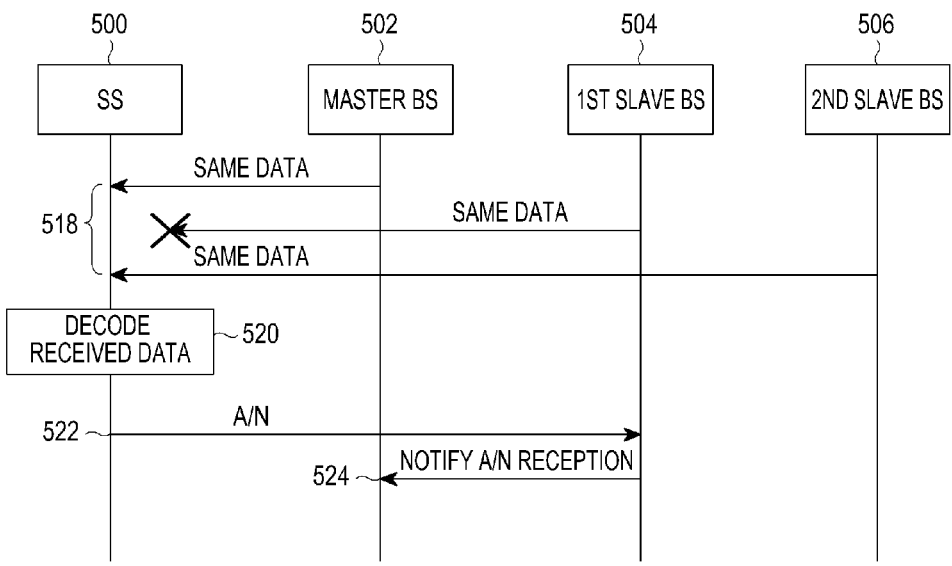
FIG. 5B illustrates a signal flow for performing a HARQ operation in a case where an A/N signal is transmitted to a predefined member BS from among all member BSs that have transmitted same data according to the third exemplary embodiment of the present invention.

FIG. 5B illustrates a signal flow for performing a HARQ operation in a case where an A/N signal is transmitted to a predefined member BS from among all member BSs that have transmitted same data to an SS according to the third exemplary embodiment of the present invention.

Referring to FIG. 5B, the cooperative cell includes the master BS 502, the first slave BS 504, and the second slave BS 506 to serve the SS 500. The master BS 502 or a slave BS selected by the master BS 502 may be set as an A/N receiving BS. It is assumed herein that the master BS 502 selects the first slave BS 504 as the A/N receiving BS.

The master BS 502, the first slave BS 504, and the second slave BS 506 transmit the same data to the SS 500 in step 518. The master BS 502, the first slave BS 504, and the second slave BS 506 may transmit the data to the SS 500 at the same time or at different time points.

The SS 500 decodes the same data received from the master BS 502, the first slave BS 504, and the second slave BS 506 and generates A/N signals or an A/N bitmap in step 520. It is assumed that the SS 500 fails to receive the same data from the first slave BS 504, while the SS 500 successfully receives the same data from the master BS 502 and the second slave BS 506. In step 522, the SS transmits an A/N signal or A/N bitmap including ACK signals for the master BS 502 and the second slave BS 506 and a NACK signal for the first slave BS 504 to the A/N receiving BS, that is, the first slave BS 504.

The first slave BS 504 notifies the master BS 502 that it has received the A/N signal indicating reception results to the respective BSs in step 524. The notification includes the ACK signals for the master BS 502 and the second slave BS 506 and the NACK signal for the first slave BS 504.

Subsequently, the master BS 502 determines whether to retransmit the same data based on the A/N signal indicating the reception results for the respective BSs. For example, while not shown, the master BS 502 determines the A/N signal regarding the individual BSs 502, 504 and 506. If the A/N signal includes at least one ACK signal, the master BS 502 does not retransmit the same data transmitted in step 518. On the other hand, if only NACK signals are included in the A/N signal, the master BS 502 determines to control retransmission of the data transmitted in step 518.

Figure 5C:
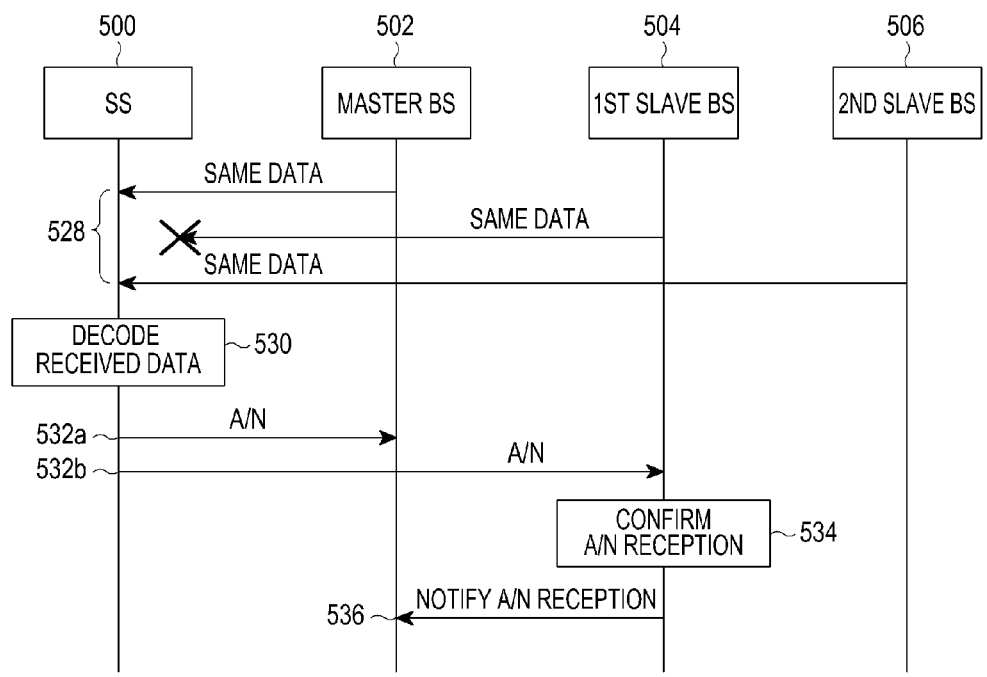
FIG. 5C illustrates a signal flow for performing a HARQ operation in a case where an A/N signal is transmitted to a predefined plurality of member BSs from among all member BSs that have transmitted same data according to the third exemplary embodiment of the present invention.

FIG. 5C illustrates a signal flow for performing a HARQ operation in a case where an A/N signal is transmitted to a predefined plurality of member BSs from among all member BSs that have transmitted same data according to the third exemplary embodiment of the present invention.

Referring to FIG. 5C, the cooperative cell includes the master BS 502, the first slave BS 504, and the second slave BS 506 to serve the SS 500. The master BS 502 may select at least two member BSs as A/N receiving BSs. It is assumed herein that the master BS 502 and the first slave BS 504 are set as A/N receiving BSs.

The master BS 502, the first slave BS 504, and the second slave BS 506 transmit the same data to the SS 500 in step 528. The master BS 502, the first slave BS 504, and the second slave BS 506 may transmit the data to the SS 500 at the same time or at different time points.

The SS 500 decodes the same data received from the master BS 502, the first slave BS 504, and the second slave BS 506 and generates an A/N signal or A/N bitmap indicating reception results for the respective BSs 502, 504 and 506 in step 530. It is assumed that the SS 500 fails to receive the same data from the first slave BS 504, while the SS 500 successfully receives the same data from the master BS 502 and the second slave BS 506. In step 532a and 532b, the SS 500 transmits an A/N signal or A/N bitmap including ACK signals for the master BS 502 and the second slave BS 506 and a NACK signal for the first slave BS 504 to the master BS 502 and the first slave BS 504.

The first slave BS 504 confirms reception of the A/N signal in step 534 and notifies the master BS 502 of the reception of the A/N signal in step 536.

Subsequently, the master BS 502 determines whether to retransmit the same data based on the A/N signal indicating the reception results for the respective BSs. For example, while not shown, the master BS 502 determines the A/N signal regarding the individual BSs 502, 504 and 506. If the A/N signal includes at least one ACK signal, the master BS 502 does not retransmit the same data transmitted in step 528. On the other hand, if only NACK signals are included in the A/N signal, the master BS 502 determines to control retransmission of the data transmitted in step 528.

<Exemplary Embodiment 4>

According to a fourth exemplary embodiment of the present invention, when a plurality of BSs transmit different data to an SS, the SS generates an A/N signal indicating the reception results of the data for the respective BSs. Specifically, the A/N signal may take the form of individual A/N signals each including the reception result of data received from one of the BSs, an A/N signal including a plurality of A/N signals indicating the reception results of the data for the respective BSs, or an A/N bitmap corresponding to the A/N signals. A/N signal transmission is considered in three cases: one is that the A/N signal is transmitted to all of the BSs that have transmitted the same data, another is that the A/N signal is transmitted only to a predefined A/N receiving BS, and the other is that the A/N signal is transmitted to a plurality of selected A/N receiving BSs.

Figure 6A:
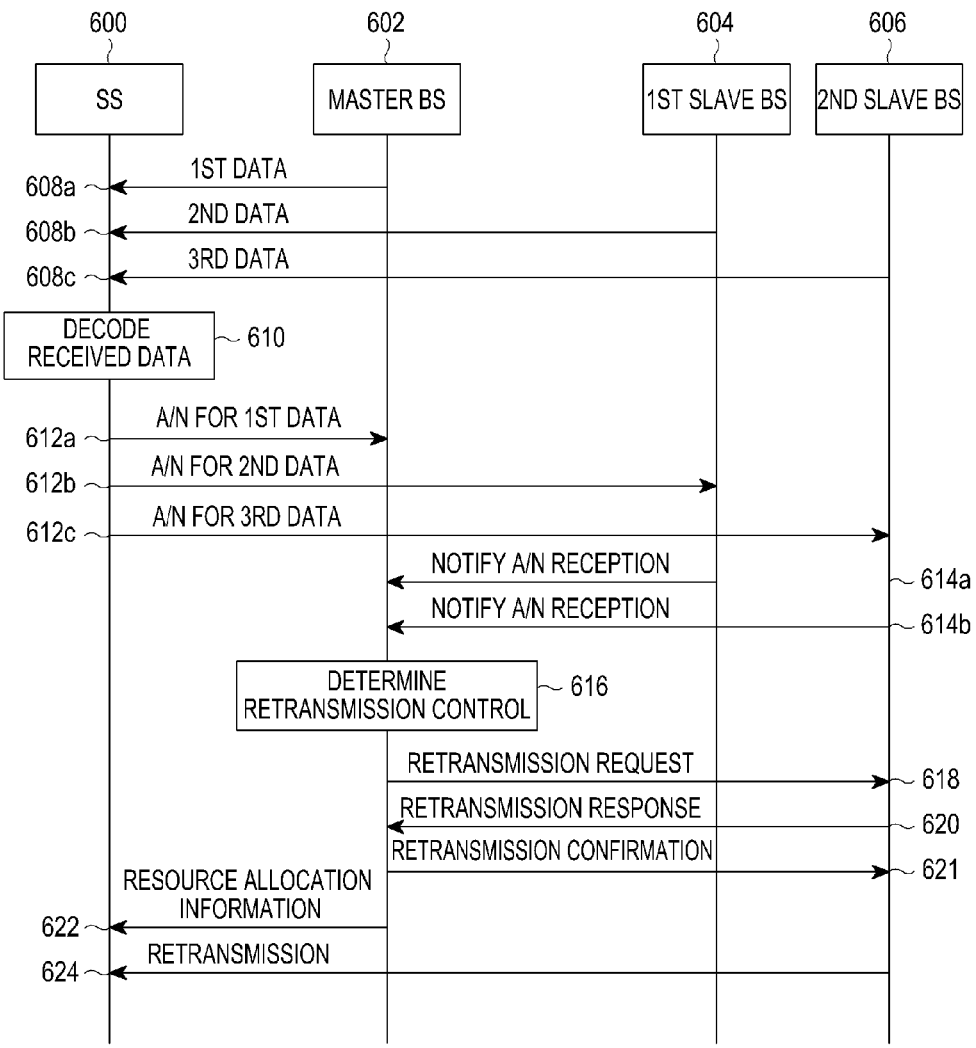
FIGS. 6A and 6B illustrate signal flows for performing a HARQ operation in a case where an individual A/N signal is transmitted to each of member BSs that have transmitted different data according to a fourth exemplary embodiment of the present invention.
Figure 6B:
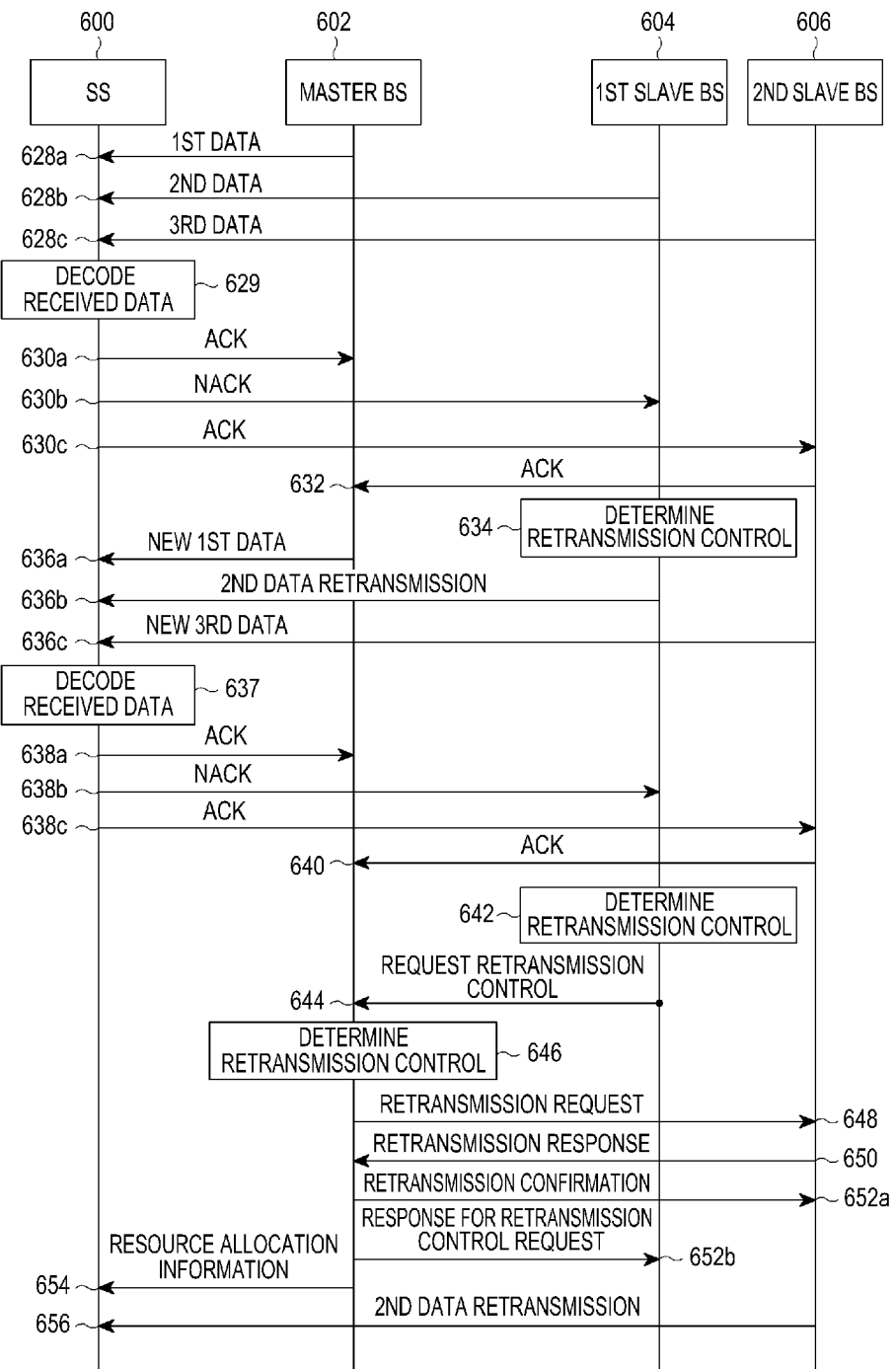

FIGS. 6A and 6B illustrate signal flows for performing a HARQ operation in a case where an individual A/N signal is transmitted to each of member BSs that have transmitted different data according to the fourth exemplary embodiment of the present invention.

Referring to FIG. 6A, a cooperative cell includes a master BS 602, a first slave BS 604, and a second slave BS 606 to serve an SS 600. It is assumed that the master BS 602 performs central control.

The master BS 602 transmits first data to the SS 600 in step 608a, the first slave BS 604 transmits second data to the SS 600 in step 608b, and the second slave BS 606 transmits third data to the SS 600 in step 608c. The first, second, and third data are different and the master BS 602, the first slave BS 604, and the second slave BS 606 may transmit the different data to the SS 600 at the same time or at different time points.

The SS 600 decodes the first, second, and third data received from the master BS 602, the first slave BS 604, and the second slave BS 606 and generates individual A/N signals indicating the reception results of the first, second, and third data in step 610.

The SS 600 transmits an A/N signal for the first data to the master BS 602 in step 612a, transmits an A/N signal for the second data to the first slave BS 604 in step 612b, and transmits an A/N signal for the third data to the third slave BS 606 in step 612c.

The first and second slave BSs 604 and 606 notify the master BS 602 that they have received the A/N signals from the SS 600, in steps 614a and 614b, respectively.

The master BS 602 determines its received A/N signal and the A/N signals for the first and second slave BSs 604 and 606 in step 616. If at least one of the A/N signals is a NACK signal, the master BS 602 determines a member BS to retransmit the data corresponding to the NACK signal and requests retransmission to the determined member BS. In step 616, the master BS 602 may store the ratio between ACK signals and NACK signals received for transmitted data from the SS served by the current cooperative cell on a per-member BS basis and may select a BS having a high ACK to NACK ratio as a BS that will allocate resources for data transmission to the SS. For example, the master BS 602 selects the second slave BS 606 for the data retransmission and transmits a retransmission request to the second slave BS 606 in step 618. The retransmission request includes at least one of the ID of the SS 600 to which the data will be retransmitted, the amount of retransmission data, and information about the QoS of the retransmission data.

Upon receipt of the retransmission request, the second slave BS 606 determines whether to accept the retransmission request through grant control. In step 620, the second slave BS 606 transmits a retransmission response including the determination result to the master BS 602. The retransmission response includes resource allocation information for retransmission. If the determination result indicates 'accept' for the retransmission request, the master BS 602 transmits a retransmission confirmation to the second slave BS 606 in step 621 and transmits resource allocation information including retransmission control information for the retransmission to the SS 600 in step 622. The second slave BS 606 retransmits the data to the SS 600 in step 624. This operation is performed by central control. If the specific BS 606 continuously fails to retransmit data or the master BS 602 determines to change the retransmitting BS for the data retransmission, the master BS 602 notifies the member BS that has received the NACK signal, a new retransmitting BS, and the SS 600 that the retransmitting BS will be changed.

Retransmission under hybrid control will be described with reference to FIG. 6B. The master BS 602 and a BS that has received a NACK signal perform hybrid control on retransmission. For example, it is assumed that the first slave BS 604 has received the NACK signal.

Referring to FIG. 6B, the master BS 602 transmits first data to the SS 600 in step 628a, the first slave BS 604 transmits second data to the SS 600 in step 628b, and the second slave BS 606 transmits third data to the SS 600 in step 628c. The first, second, and third data are different and the master BS 602, the first slave BS 604, and the second slave BS 606 may transmit the different data to the SS 600 at the same time or at different time points.

The SS 600 decodes the first, second, and third data received from the master BS 602, the first slave BS 604, and the second slave BS 606 and generates individual A/N signals indicating the reception results of the first, second, and third data in step 629. For example, it is assumed that the reception result of the second data transmitted by the first slave BS 604 is a failure and the reception results of the first and third data transmitted by the master BS 602 and the second slave BS 606 are a success. The SS 600 transmits an ACK signal for the first data to the master BS 602 in step 630a, transmits a NACK signal for the second data to the first slave BS 604 in step 630b, and transmits an ACK signal for the third data to the third slave BS 606 in step 630c.

The first and second slave BSs 604 and 606 forward the A/N signals for the second and third data to the master BS 602. For example, only the ACK signal for the third data is transmitted in step 632 in FIG. 6B. Meanwhile, if the master BS 602 has not received an ACK signal from a slave BS that transmitted data to the SS 600 for a predefined time, the master BS 602 determines that transmission of the data has failed. The master BS 602 may store the ratio between ACK signals and NACK signals received for transmitted data from the SS 600 served by the current cooperative cell on a per-member BS basis and may select a BS having a high ACK to NACK ratio as a BS that will allocate resources for data transmission to the SS 600.

Since the master BS 602 has received the ACK signal for the first data, it transmits new first data to the SS 600 in step 636a. Since the first slave BS 604 has received the NACK signal for the second data, the first slave BS 604 determines retransmission of the second data in step 634 and retransmits the second data to the SS 600 in step 636b.

Similarly, since the second slave BS 606 has received the ACK signal for the third data, it transmits new third data to the SS 600 in step 636c.

In step 637, the SS 600 decodes the new first data, the retransmitted second data, and the new third data received from the master BS 602, the first slave BS 604, and the second slave BS 606 and generates individual A/N signals indicating reception results of the first, second, and third data. It is assumed herein that only the reception result of the second data transmitted by the first slave BS 604 is a failure.

The SS 600 transmits an ACK signal for the first data to the master BS 602 in step 638a, transmits a NACK signal for the second data to the first slave BS 604 in step 638b, and transmits an ACK signal for the third data to the third slave BS 606 in step 638c. In step 640, the second slave BS 606 forwards the ACK signal for the third data to the master BS 602.

Since the first slave BS 604 has received the NACK signal for the retransmitted second data, the first slave BS 604 determines retransmission of the second data in step 642. The first slave BS 604 determines whether it can retransmit data to the SS 600 in its current state and determines whether to transmit a request for controlling retransmission to the SS 600 to the master BS 602 according to the determination result. Specifically, the first slave BS 604 compares the number of NACK signals successively received from the SS 600 for a predefined time or determines its available resource state. If the number of NACK signals exceeds a threshold or the available resources of the first slave BS 604 are not sufficient for additional retransmission, the first slave BS 604 determines to request the master BS 602 to control retransmission of the second data to the SS 600.

In step 644, the first slave BS 604 transmits a retransmission control request including information about the amount and QoS of retransmission data to the master BS 602.

The master BS 602 selects a BS having a high ACK ratio, a low cell load, and a good channel state as a BS that will allocate resources for the data retransmission to the SS 600 in step 646. In the illustrated case of FIG. 6B, the master BS 602 selects the second slave BS 606 as a retransmitting BS.

The master BS 602 transmits a retransmission request to the second slave BS 606 in step 648. The retransmission request includes the ID of the SS 600 to which the data is to be retransmitted, the amount of retransmission data, and information about the QoS of the retransmission data.

Upon receipt of the retransmission request, the second slave BS 606 determines whether it can allocate resources for the data retransmission through grant control and transmits a retransmission response including the determination result to the master BS 602 in step 650. The retransmission response includes resource allocation information for the data retransmission. If the determination result acquired from the retransmission response indicates that retransmission of the second data is available, the master BS 602 transmits a retransmission confirmation to the second slave BS 606 in step 652a. In step 652b, the master BS 602 transmits a retransmission control request response indicating that the retransmission control request received in step 644 has been accepted to the first slave BS 604. The master BS 602 transmits resource allocation information for the retransmission to the SS 600 in step 654. The second slave BS 606 retransmits the second data to the SS 600 in step 656.

Figure 7:
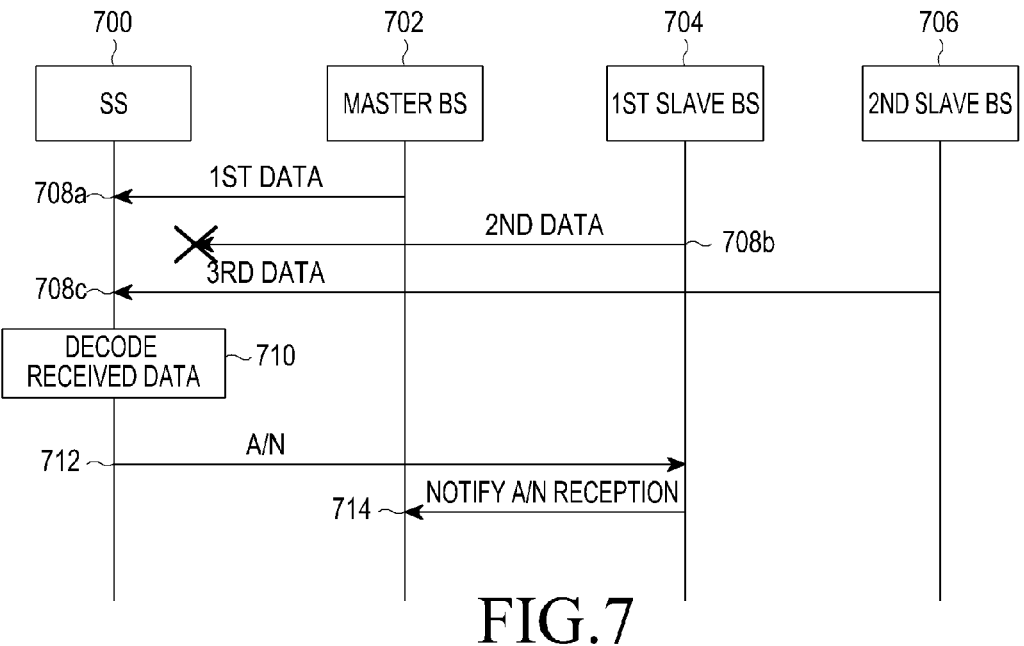
FIG. 7 illustrates a signal flow for performing a HARQ operation in a case where an A/N signal is transmitted to a predefined BS from among all member BSs that have transmitted different data according to the fourth exemplary embodiment of the present invention.

FIG. 7 illustrates a signal flow for performing a HARQ operation in a case where an A/N signal is transmitted to a predefined BS from among all member BSs that have transmitted different data according to the fourth exemplary embodiment of the present invention.

Referring to FIG. 7, a cooperative cell includes a master BS 702, a first slave BS 704, and a second slave BS 706 to serve an SS 700. The master BS 702 or one slave BS selected by the master BS 702 may be set as an A/N receiving BS. It is assumed herein that the master BS 702 selects the first slave BS 704 as an A/N receiving BS.

The master BS 702 transmits first data to the SS 700 in step 708a, the first slave BS 704 transmits second data to the SS 700 in step 708b, and the second slave BS 706 transmits third data to the SS 700 in step 708c. The first, second, and third data are different and the master BS 702, the first slave BS 704, and the second slave BS 706 may transmit the different data to the SS 700 at the same time or at different time points.

The SS 700 decodes the first, second, and third data received from the master BS 702, the first slave BS 704, and the second slave BS 706 and generates an A/N signal or A/N map indicating the reception results of the first, second, and third data for the respective BSs in step 710. For example, it is assumed that the SS 700 has not received the second data and succeeded in receiving the first and third data. Thus, the SS 700 transmits an A/N signal including a NACK signal for the first slave BS 704 and ACK signals for the master BS 702 and the second slave BS 706 to the first slave BS 704 in step 712. The first slave BS 704 notifies the master BS 702 of reception of the A/N signal in step 714. While not shown, if the master BS 702 subsequently determines that a NACK signal has been received for data transmitted by a member BS from the SS 700 or an ACK signal has not been received for data transmitted by a member BS from the SS 700 for a predefined time, the master BS 702 selects a retransmitting BS and controls the selected BS to retransmit the data.

Figure 8:
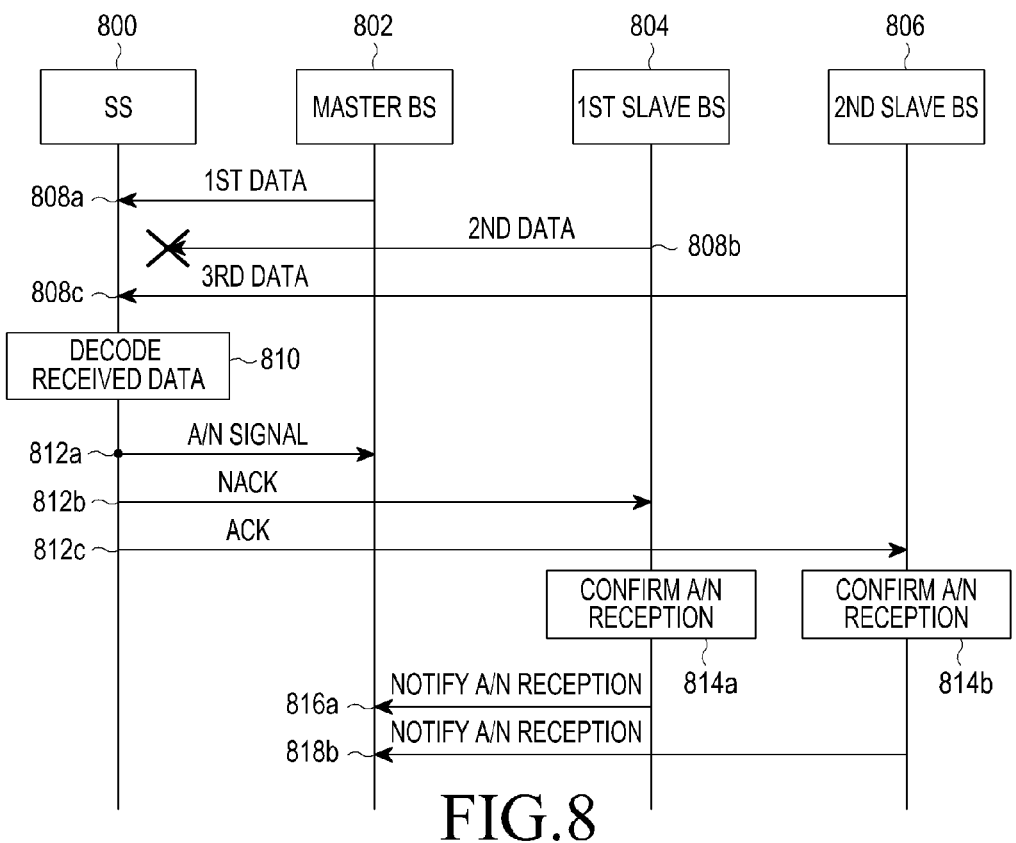
FIG. 8 illustrates a signal flow for performing a HARQ operation in a case where an A/N signal is transmitted to a predefined plurality of BSs from among all member BSs that have transmitted different data according to the fourth exemplary embodiment of the present invention.

FIG. 8 illustrates a signal flow for performing a HARQ operation in a case where A/N signals are transmitted to a predefined plurality of BSs from among all member BSs that have transmitted different data according to the fourth exemplary embodiment of the present invention.

Referring to FIG. 8, a cooperative cell includes a master BS 802, a first slave BS 804, and a second slave BS 806 to serve an SS 800. The master BS 802 may select at least two member BSs as A/N receiving BSs. It is assumed herein that the master BS 802 and the first and second slaves BS 804 and 806 are all set as A/N receiving BSs.

The master BS 802 transmits first data to the SS 800 in step 808a, the first slave BS 804 transmits second data to the SS 800 in step 808b, and the second slave BS 806 transmits third data to the SS 800 in step 808c. The first, second, and third data are different and the master BS 802, the first slave BS 804, and the second slave BS 806 may transmit the different data to the SS 800 at the same time or at different time points.

The SS 800 decodes the first, second, and third data received from the master BS 802, the first slave BS 804, and the second slave BS 806 and generates an A/N signal or A/N map indicating reception results of the first, second, and third data for the respective BSs in step 810. For example, it is assumed that the SS 800 has not received the second data from the first slave BS 804 and succeeded in receiving the first and third data from the master BS 802 and the second slave BS 806. Thus, the SS 800 transmits an A/N signal including a NACK signal for the first slave BS 804 and ACK signals for the master BS 802 and the second slave BS 806 to the master BS 802 and the first and second slave BSs 804 and 806 in steps 812a, 812b and 812c.

The first and second slave BSs 804 and 806 confirm reception of the A/N signal in steps 814a and 814b and notify the master BS 802 of reception of the A/N signal in steps 816a and 816b. The master BS 802 determines the A/N signal regarding the master BS 802, the first slave BS 804, and the second slave BS 806. If the master BS 802 subsequently determines that a NACK signal has been received for data transmitted by a member BS from the SS 700 or an ACK signal has not been received for data transmitted by a member BS from the SS 700 for a predefined time, the master BS 702 selects a retransmitting BS and controls the selected BS to retransmit the data.

In accordance with Exemplary Embodiment 2, Exemplary Embodiment 3, and Exemplary Embodiment 4, a master BS determines an A/N signal indicating the reception result of data that each member BS has transmitted to an SS. The master BS removes a member BS for which at least a predefined number of NACK signals have been received for a predefined time or successively from a cooperative cell and adds a new member BS to the cooperative cell, thereby reconfiguring the cooperative cell.

2. UL HARQ Operations

Exemplary embodiments of the present invention regarding UL data transmission, that is, data transmission from an SS to member BSs in a cooperative cell, will be described separately based on the following conditions. Specifically, the exemplary embodiments of the present invention are differentiated depending on whether an SS transmits the same data or different data to a plurality of member BSs and depending on the number of member BSs transmitting A/N signals indicating reception results (hereinafter, referred to as A/N transmitting BSs) among member BSs that have received data from the SS.

UL retransmission may be controlled by a master BS (i.e., central control) or by a master BS and in cooperation with a slave BS (i.e., hybrid control). In a case of central control, upon receipt of data from an SS, slave BSs forward the received data or A/N signals for the received data to the master BS. The master BS determines a member BS that has transmitted a NACK signal, selects a BS that will allocate UL resources to re-receive data corresponding to the NACK signal from the SS, and performs data retransmission in cooperation with the selected BS.

In a case of hybrid control, each of the member BSs to which the SS initially transmitted data performs data retransmission of the SS in its available resources. If any member BS does not have available resources for data retransmission of the SS or has generated at least a predefined number of NACK signals, the member BS may transmit a retransmission control request to the master BS. Upon receipt of the retransmission control request, the master BS selects a BS having a high ACK generation ratio for data reception from the SS served by the cooperative cell, a low cell load, and a good channel state as a BS to allocate resources for data retransmission of the SS and performs retransmission in cooperation with the selected BS.

<Exemplary Embodiment 5>

According to a fifth exemplary embodiment of the present invention, when an SS transmits data to one BS in a cooperative cell, one of member BSs in the cooperative cell is set as an A/N transmitting BS that will transmit an A/N signal indicating the reception result of the data from the SS. A master BS or a slave BS selected by the master BS may be set as the A/N transmitting BS. If the A/N transmitting BS is not the master BS, the A/N transmitting BS transmits an A/N signal to the master BS as well as to the SS. Specifically, transmission of an ACK signal for data transmitted by an SS from an A/N transmitting BS and transmission of a NACK signal for data transmitted by an SS from an A/N transmitting BS will be described separately. In addition, retransmission in the case of a NACK signal will further be divided into central control and hybrid control.

Figure 9A:
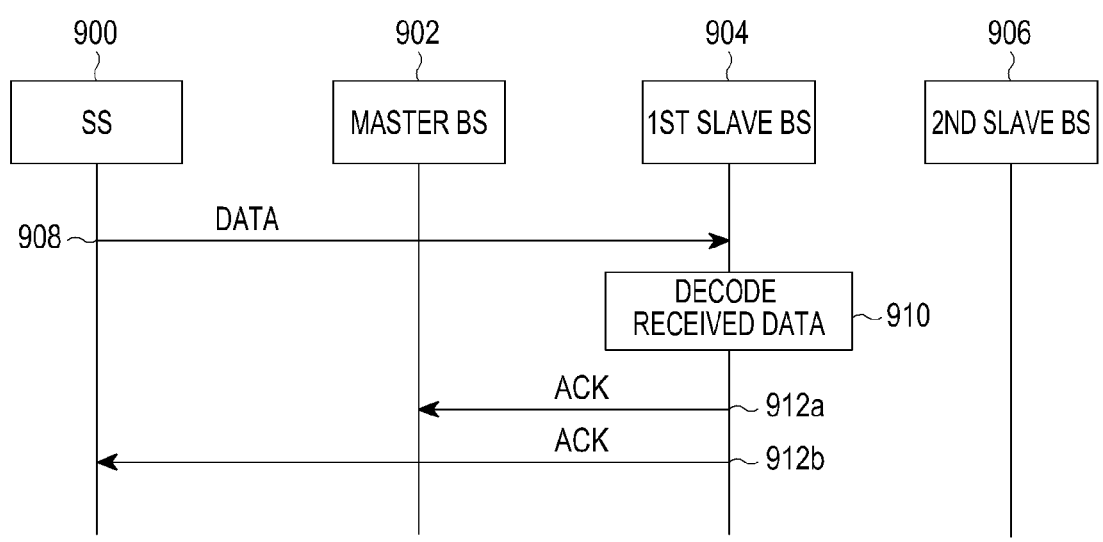
FIGS. 9A, 9B and 9C illustrate signal flows for performing a HARQ operation regarding Uplink (UL) traffic according to a fifth exemplary embodiment of the present invention.
Figure 9B:
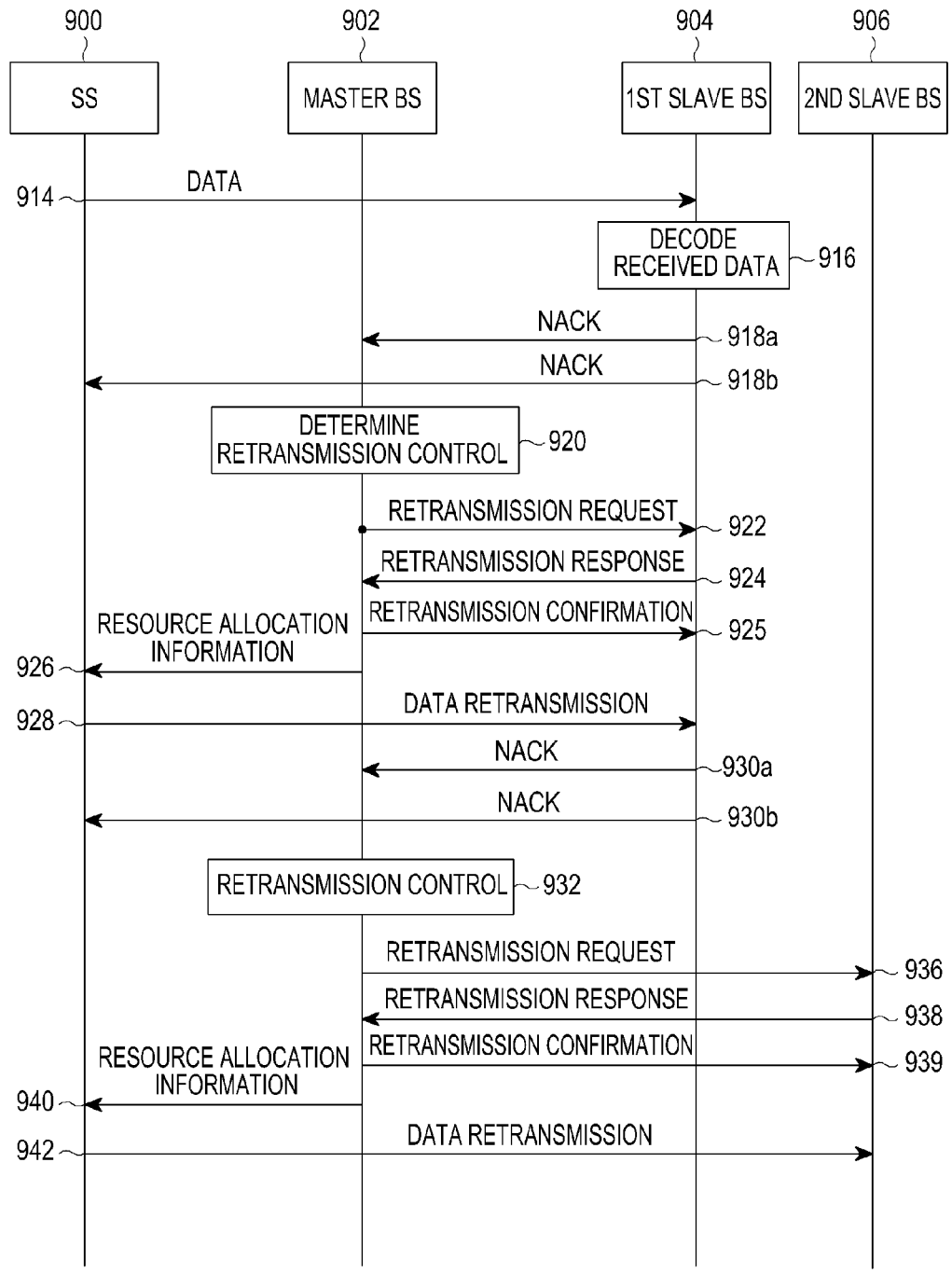
Figure 9C:
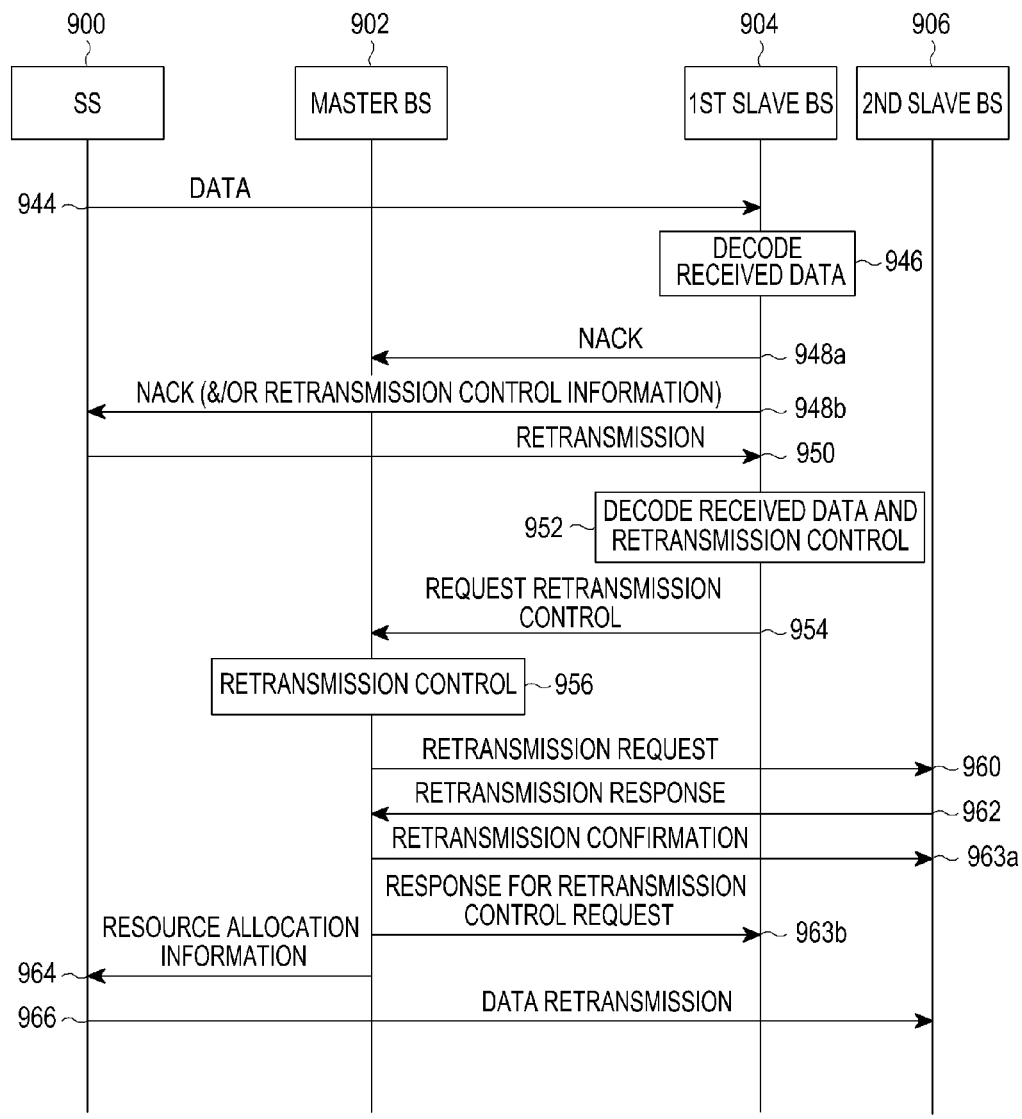

FIGS. 9A, 9B and 9C illustrate signal flows for performing a HARQ operation regarding UL traffic according to the fifth exemplary embodiment of the present invention. It is assumed that an SS transmits data only to one slave BS.

Referring to FIG. 9A, a cooperative cell includes a master BS 902 for transmitting control information and data and managing slave BSs 904 and 906, the first slave BS 904, and the second slave BS 906 as member BSs to serve an SS 900.

An SS 900 transmits data to the first slave BS 904 in step 908. In step 910, the first slave BS 904 decodes the received data and generates an A/N signal indicating the reception result of the data. Herein, it is assumed that the first slave BS 904 has received the data successfully. The first slave BS 904 transmits an ACK signal to the master BS 902 and the SS 900, in steps 912a and 912b, respectively. The master BS 902 determines that data transmission from the SS 900 is not needed, because of the ACK reception.

Referring to FIG. 9B, the SS 900 transmits data to the first slave BS 904 in step 914. In step 916, the first slave BS 904 set as an A/N transmitting BS decodes the data and generates an A/N signal indicating the reception result of the data. It is assumed that if the first slave BS 904 has not received the data, the master BS 902 performs central control. The first slave BS 904 transmits a NACK signal to both the master BS 902 and the SS 900 in steps 918a and 918b, respectively. The master BS 902 determines data retransmission of the SS 900 because of the NACK reception of step 914 in step 920. If the master BS 902 has not received an ACK signal from the first slave BS 904 for a predefined time even though the first slave BS 904 has not transmitted a NACK signal, the master BS 902 prepares for data retransmission of the SS 900.

If resources for the data retransmission were allocated before the data transmission of step 914, that is, the data retransmission is to be performed in the same resources as the initial transmission to the BS, steps 922, 924 and 926 are not performed and the SS 900 retransmits the data in the same resources as for the initial data transmission.

On the other hand, if the retransmission resources are allocated at a retransmission time, the master BS 902 transmits a retransmission request to the first slave BS 904 in step 922. The retransmission request includes at least one of the ID of the SS 900 that will retransmit data, the amount of retransmission data, and information about the QoS of the retransmission data.

Upon receipt of the retransmission request, the first slave BS 904 determines whether to accept the retransmission request through grant control. The first slave BS transmits a retransmission response including the determination result to the master BS 902 in step 924. The retransmission response includes resource allocation information for the data retransmission. If the determination result included in the retransmission response indicates that retransmission of the data transmitted in step 914 can be performed, the master BS 902 transmits a retransmission confirmation to the first slave BS 904 in step 925 and transmits resource allocation information to the SS 900 in step 926. In step 928, the SS 900 retransmits the data transmitted in step 914 to the first slave BS 904. On the assumption that the reception result of the retransmission data is a failure, the first slave BS 904 transmits a NACK signal again to the master BS 902 and the SS 900 in steps 930a and 930b, respectively. If the master BS 920 receives the NACK signal or has not received an ACK signal for a predefined time, the master BS 920 determines retransmission control again in step 932. Specifically, the master BS 902 compares the number of NACK signals received from the first slave BS 904 for a predefined time with a threshold. If the number of NACK signals exceeds the threshold, the master BS 902 changes the retransmission target from the first slave BS 904 to another BS. The new retransmission target is a BS having a high ACK ratio, a low cell load, and a good channel state from among member BSs that serve the SS 900. In step 936, the master BS 902 transmits a retransmission request to the second slave BS 906 in regard to the data retransmission of the SS 900. The retransmission request includes at least one of the ID of the SS 900 that will retransmit data, the amount of retransmission data, and information about the QoS of the retransmission data.

Upon receipt of the retransmission request, the second slave BS 906 determines whether to accept the retransmission request through grant control. The second slave BS 906 transmits a retransmission response including the determination result to the master BS 902 in step 938. The retransmission response includes resource allocation information for the data retransmission. If the determination result included in the retransmission response indicates 'accept' for that data retransmission request, the master BS 902 transmits a retransmission confirmation to the second slave BS 906 in step 939 and transmits resource allocation information to the SS 900 in step 940. In step 942, the SS 900 retransmits the data transmitted in step 914 to the second slave BS 906.

On the contrary, if the determination result included in the retransmission response indicates 'reject' for the retransmission request, the master BS 902 transmits a retransmission request to another slave BS within the cooperative cell, while not shown.

The illustrated case of FIG. 9C is based on the assumption that an SS retransmits data under the control of the master BS 902 and an A/N transmitting BS.

The SS 900 transmits data to the first slave BS 904 in step 944. The first slave BS 904 set as the A/N transmitting BS decodes the data and generates an A/N signal indicating the reception result of the data in step 946. It is assumed that the first slave BS 904 has not received the data. The first slave BS 904 determines retransmission of the data from the SS 900 because the first slave BS 904 has not received the data from the SS 900 in step 944. The first slave BS 904 transmits a NACK signal to the master BS 902 and the SS 900 in steps 948*a* and 948*b*, respectively. While not shown, the first slave BS 904 transmits resource allocation information for the data retransmission together with the NACK signal to the SS 900. In step 950, the SS 900 retransmits the data transmitted in step 944 to the first slave BS 904. Upon receipt of the retransmission data, the first slave BS 904 decodes the retransmission data and determines whether to transmit a request for control data retransmission of the SS 900 to the master BS 902 in step 952. It is assumed herein that the first slave BS 904 has not received the retransmission data. The first slave BS 904 compares the number of NACK signals that it has generated with a threshold or determines whether it has available resources for the data retransmission of the SS 900. If the number of NACK signals exceeds the threshold or available resources are insufficient for the data retransmission of the SS 900, the first slave BS 904 determines to request a retransmission control to the master BS 902 and transmits a retransmission control request to the master BS 902 in step 954.

Upon receipt of the retransmission control request, the master BS 902 selects a BS having a high ACK ratio, a low cell load, and a good channel state as a BS that will allocate resources for data retransmission of the SS 900 in step 956. In the illustrated case of FIG. 9C, the master BS 902 selects the second slave BS 906.

The master BS 902 transmits a retransmission request to the second slave BS 906 in step 960. The retransmission request includes the ID of the SS 900 that will retransmit data, the amount of retransmission data, and information about the QoS of the retransmission data. Upon receipt of the retransmission request, the second slave BS 906 determines whether it can allocate resources for the data retransmission through grant control and transmits a retransmission response including the determination result to the master BS 902 in step 962. The retransmission response includes resource allocation information for the data retransmission. If the determination result acquired from the retransmission response indicates 'accept' for the retransmission request, that is, that retransmission of the data transmitted in step 944 can be performed, the master BS 902 transmits a retransmission confirmation to the second slave BS 906 in step 963*a*. In step 963*b*, the master BS 902 transmits a retransmission control request response to the first slave BS 904, indicating that a BS for resource allocation for the data retransmission has been changed. The master BS 902 transmits resource allocation information for the data retransmission to the SS 900 in step 964. The SS 900 retransmits the data transmitted in step 944 to the second slave BS 906 in step 966.

On the contrary, if the determination result included in the retransmission response indicates 'reject' for the retransmission request in step 962, that is, that retransmission of the data transmitted in step 944 is not possible, the master BS 902 transmits a retransmission request to another slave BS within the cooperative cell, while not shown.

<Exemplary Embodiment 6>

According to a sixth exemplary embodiment of the present invention, in a cooperative cell, an SS transmits the same data to member BSs of the cooperative cell and one A/N transmitting BS transmits a reception result signal to the SS for the data transmitted by the SS. The A/N transmitting BS is one of the member BSs. The SS transmits the same data to the member BSs of the cooperative cell at the same time or at different time points. Data retransmission from the SS may be performed at each of the member BSs that received the same data from the SS. In a case where the master BS controls a data retransmission operation, each of the member BSs that have received the same data generates an A/N signal indicating the reception result of the same data and transmits the A/N signal to the master BS, or transmits the same data received from the SS to the master BS. The master BS combines the received same data or generates one A/N signal by determining the received A/N signals. Specifically, if at least one member BS has received the same data successfully and the A/N transmitting BS transmits an ACK signal to the SS, the SS does not retransmit the same data. If all of the member BSs that have received the same data have not received the same data normally, the A/N transmitting BS transmits a NACK signal to the SS and the master BS determines retransmission of the same data. In this case, the master BS allocates resources for the data retransmission and selects one or more BSs to receive retransmission data from the SS.

Figure 10A:
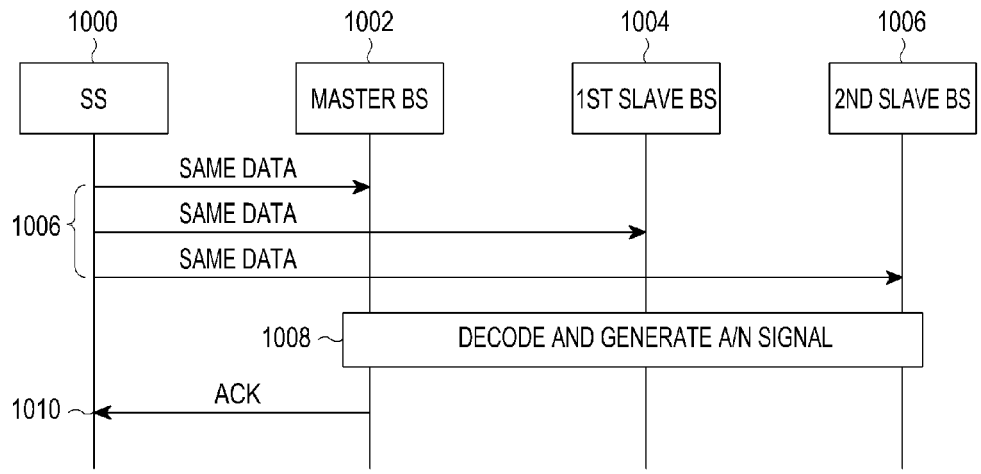
FIGS. 10A and 10B illustrate signal flows for performing a HARQ operation regarding UL traffic according to a sixth exemplary embodiment of the present invention.
Figure 10B:
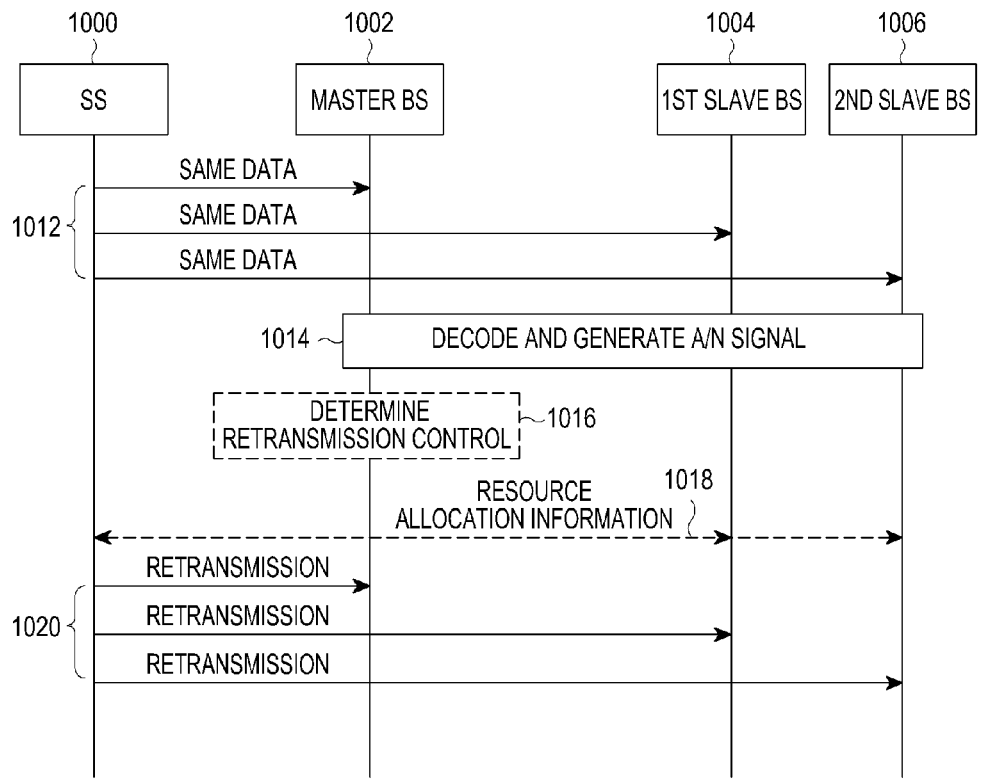

FIGS. 10A and 10B illustrate signal flows for performing a HARQ operation regarding UL traffic according to the sixth exemplary embodiment of the present invention.

Referring to FIG. 10A, a cooperative cell includes a master BS 1002, a first slave BS 1004, and a second slave BS 1006 as member BSs to serve an SS 1000.

The SS 1000 transmits the same data to the master BS 1002, the first slave BS 1004, and the second slave BS 1006 in step 1006. The same data may be transmitted to the master BS 1002, the first slave BS 1004, and the second slave BS 1006 at the same time or at different time points. In step 1008, each of the master BS 1002, the first slave BS 1004, and the second slave BS 1006 decodes the received data and generates an A/N signal indicating the reception result of the data. The first slave BS 1004 and the second slave BS 1006 transmit their reception results or the received data to the master BS 1002. The master BS 1002 generates one A/N signal by combining the reception results including its reception result or the data including its received data. Herein, it is assumed that at least one of the master BS 1002, the first slave BS 1004, and the second slave BS 1006 has received the data successfully or at least one of the reception results is an ACK signal. In this case, the master BS 1002 generates an ACK signal for the data transmitted in step 1006. Herein, the master BS 1002 is assumed to be an A/N transmitting BS. The master BS 1002 transmits the ACK signal to the SS 1000 in step 1010.

Referring to FIG. 10B, the SS 1000 transmits the same data to the master BS 1002, the first slave BS 1004, and the second slave BS 1006 in step 1012. The same data may be transmitted to the master BS 1002, the first slave BS 1004, and the second slave BS 1006 at the same time or at different time points.

In step 1014, each of the master BS 1002, the first slave BS 1004, and the second slave BS 1006 decodes the received data and generates an A/N signal indicating the reception result of the data. The first slave BS 1004 and the second slave BS 1006 transmit their reception results or the received data to the master BS 1002. The master BS 1002 generates one A/N signal by combining the reception results including its reception result or the data including its received data. Herein, it is assumed that none of the master BS 1002, the first slave BS 1004, and the second slave BS 1006 have received the data successfully or all of the reception results are NACK signals. In this case, the master BS 1002 determines retransmission of the data transmitted in step 1016. The master BS 1002 transmits resource allocation information for retransmission to the SS 1000, the first slave BS 1001, and the second slave BS 1002 in step 1018. Because the SS 1000 has not received an ACK signal for the transmitted same data for a predefined time, the SS 1000 determines that the resource allocation information is for retransmission of the same data transmitted in step 1012. The resource allocation information includes information about retransmission targets, for example, the master BS 1002, the first slave BS 1004, and the second slave BS 1006 and information about resource allocation for the retransmission. The resource allocation information may further include a retransmission command to the SS 1000. If the master BS 1002 performs the data retransmission of the SS 1000 in resources allocated for retransmission before the data transmission of step 1012, the SS 1000 and each BS perform the data retransmission using the already allocated resources without the need for the master BS's transmitting the resource allocation information in step 1018.

In step 1020, the SS 1000 retransmits the same data to the master BS 1002, the first slave BS 1004, and the second slave BS 1006.

<Exemplary Embodiment 7>

According to a seventh exemplary embodiment of the present invention, in a cooperative cell, an SS transmits different data to member BSs of the cooperative cell. The SS transmits the different data to the member BSs at the same time or at different time points. Upon receipt of the different data, each of the member BSs decodes the received data, transmits an A/N signal indicating the reception result of the data to the SS, and controls data retransmission of the SS on its own based on the reception result. If a member BS fails in controlling data retransmission of the SS successively at least a predefined number of times or the member BS does not have sufficient resources for data retransmission of the SS, the member BS requests a retransmission control to the master BS. The master BS selects a member BS to perform retransmission on behalf of the member BS and performs data retransmission in cooperation with the selected member BS.

Figure 11:
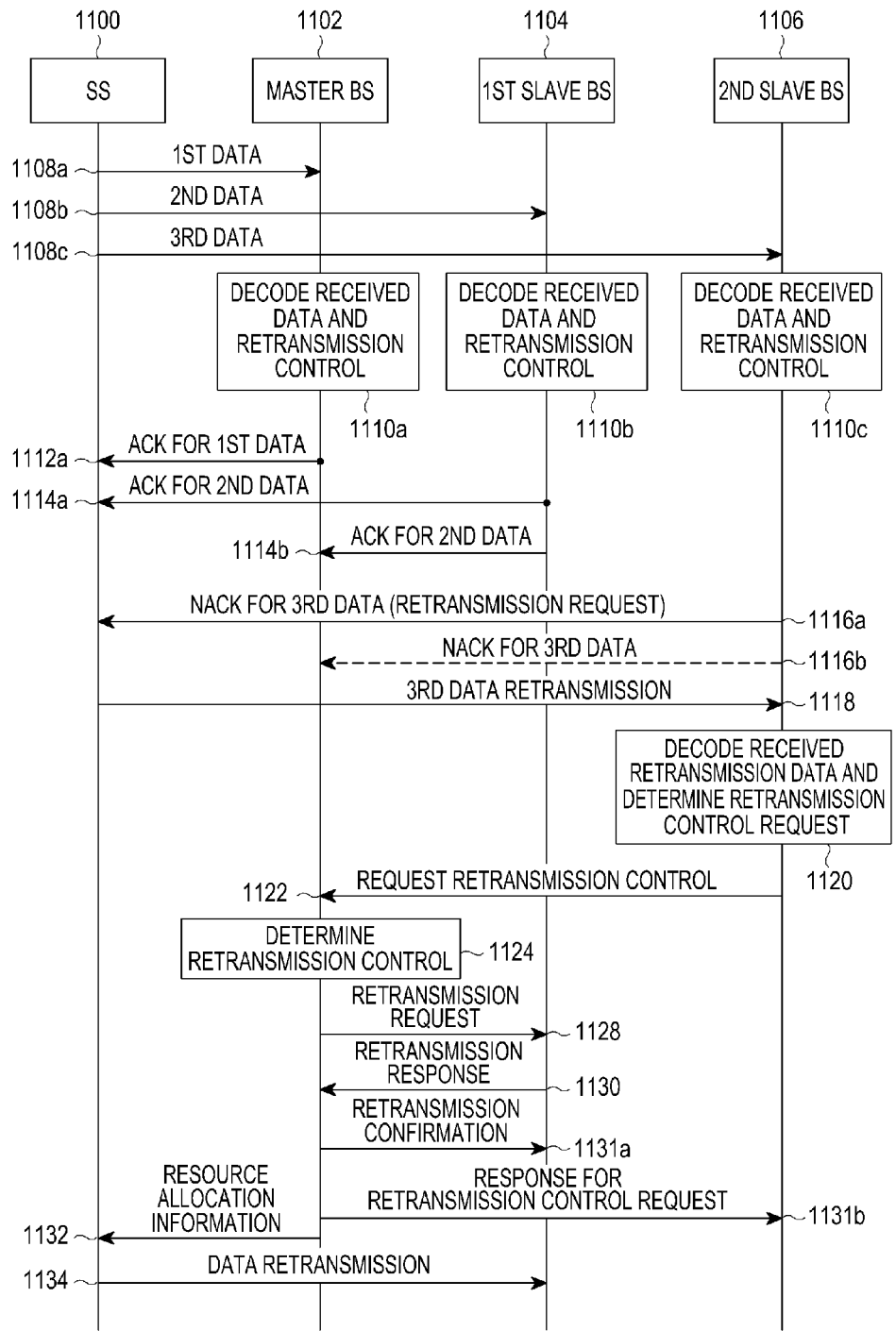
FIG. 11 illustrates a signal flow for performing a HARQ operation regarding UL traffic according to a seventh exemplary embodiment of the present invention.

FIG. 11 illustrates a signal flow for performing a HARQ operation regarding UL traffic according to the seventh exemplary embodiment of the present invention.

Referring to FIG. 11, a cooperative cell includes a master BS 1102, a first slave BS 1104, and a second slave BS 1106 as member BSs with respect to an SS 1100.

The SS 1100 transmits first data to the master BS 1102 in step 1108a, second data to the first slave BS 1104 in step 1108b, and third data to the second slave BS 1106 in step 1108c.

It is assumed that the master BS 1102 and the first slave BS 1104 have received the first data and the second data successfully and the second slave BS 1106 has not received the third data. The master BS 1102 decodes the first data, generates an ACK signal indicating the reception result of the first data, and does not perform retransmission of the first data in step 1110a. The first slave BS 1104 decodes the second data, generates an ACK signal indicating the reception result of the second data, and does not perform retransmission of the second data in step 1110b. The second slave BS 1106 decodes the third data, generates a NACK signal indicating the reception result of the third data, and determines to perform retransmission of the third data in step 1110c.

The master BS 1102 transmits the ACK signal for the first data to the SS 1100 in step 1112a and the first slave BS 1104 transmits the ACK signal for the second data to the master BS 1102 and the SS 1100 in steps 1114a and 1114b. The second slave BS 1106 transmits the NACK signal for the third data to the master BS 1102 and the SS 1100 in steps 1116a and 1116b. The second slave BS 1106 further transmits resource allocation information for retransmission of the third data to the SS 1100 in step 1116a. If the same resources as used for the initial data transmission are used for the retransmission, the second slave BS 1106 does not need to transmit the resource allocation information in step 1116a.

In step 1118, the SS 1100 retransmits the third data in resources indicated by the resource allocation information to the second slave BS 1106. Upon receipt of the third data, the second slave BS 1106 determines the reception result of the retransmitted third data and determines whether to transmit a retransmission control request for the SS 1100 to the master BS 1102 according to the reception result in step 1120. Specifically, if the second slave BS 1106 fails in receiving the retransmitted third data, the second slave BS 1106 compares the number of generated NACK signals with a threshold. If the number of NACK signals exceeds the threshold, the second slave BS 1106 transmits a retransmission control request to the master BS 1102 in step 1122. In addition, if the cell load of the second slave BS 1106 increases to or above a threshold or the channel state between the second slave BS 1106 and the SS 1100 gets poor to or below a threshold, the second slave BS 1106 may also transmit a retransmission control request to the master BS 1102 so that the master BS 1102 may select another BS for performing the data retransmission.

Upon receipt of the retransmission control request, the master BS 1102 determines retransmission control for the third data and selects a BS to receive retransmitted third data in step 1124. It is assumed that the first slave BS 1104 is selected.

In step 1128, the master BS 1102 transmits a retransmission request for retransmission of the third data from the SS 1100 to the first slave BS 1104. The first slave BS 1104 determines whether to perform the data retransmission through grant control and transmits a retransmission response including the determination result to the master BS 1102 in step 1130. If the determination result indicates 'accept' for the retransmission request, that is, that retransmission of the third data is possible, the master BS 1102 transmits a retransmission confirmation to the first slave BS 1104 in step 1131a and transmits a response for the retransmission control request to the second slave BS 1106 in step 113 1b. In step 1132, the master BS 1102 transmits resource allocation information for the retransmission and the NACK signal for the third data retransmitted in step 1118 to the SS 1100. The SS 1100 retransmits the third data to the first slave BS 1104 in step 1134.

On the other hand, if the retransmission control information indicates that the third data cannot be retransmitted in step 1130, the master BS 1102 transmits a retransmission command to another slave BS within the cooperative cell.

In accordance with Exemplary Embodiment 5, Exemplary Embodiment 6, and Exemplary Embodiment 7, a master BS determines an A/N signal indicating the reception result of data transmitted to each member BS by an SS. The master BS removes a member BS that has generated as many NACK signals as or more NACK signals than a threshold for a predefined time or successively from a cooperative cell and adds a new member BS to the cooperative cell, thereby reconfiguring the cooperative cell.

Figure 12A:
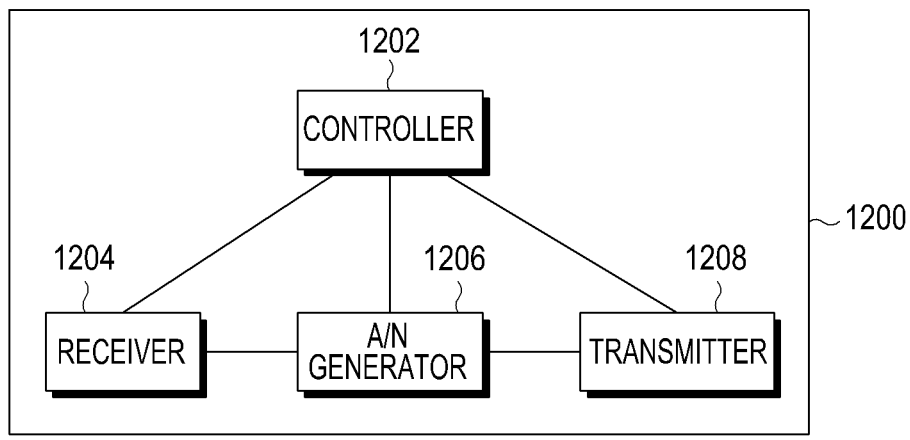
FIG. 12A is a block diagram of a Subscriber Station (SS) according to an exemplary embodiment of the present invention.

FIG. 12A is a block diagram of an SS according to an exemplary embodiment of the present invention.

Referring to FIG. 12A, an SS 1200 includes a controller 1202, a receiver 1204, an A/N generator 1206, and a transmitter 1208.

In regard to a DL HARQ operation of the SS 1200, the receiver 1204 receives data from at least one member BS in a cooperative cell. If the receiver 1204 receives data from two or more member BSs, the received data may be the same data or different data.

Upon detection of the data reception at the receiver 1204, the controller 1202 determines the reception result of the data received from the at least one member BS and controls the A/N generator 1206 to generate an A/N signal indicating the reception result.

If the same data has been received from two or more member BSs and the data has been received successfully from at least one of the member BSs, the A/N generator 1206 generates one ACK signal. If all of the same data has not been received, the A/N generator 1206 generates one NACK signal. Alternatively, the controller 1202 determines the reception result of the data received from each of the two or more member BSs and controls the A/N generator 1206 to generate an individual ACK or NACK signal for the data from each of the two or more member BSs.

The transmitter 1208 transmits the A/N signal generated from the A/N generator 1206 to the at least one BS. The at least one BS is at least one of the member BSs of the cooperative cell.

In regard to a UL HARQ operation of the SS 1200, the transmitter 1208 transmits data to at least one member BS. If the transmitter 1208 transmits data to two or more member BSs, the transmitted data may be the same data or different data.

The controller 1202 monitors reception of a reception result signal for the data at the receiver 1204 from at least one predefined BS among the at least one member BS. If the reception result signal is a NACK signal, the controller 1202 controls retransmission of the data as commanded by a retransmission controlling BS of the cooperative cell.

Figure 12B:
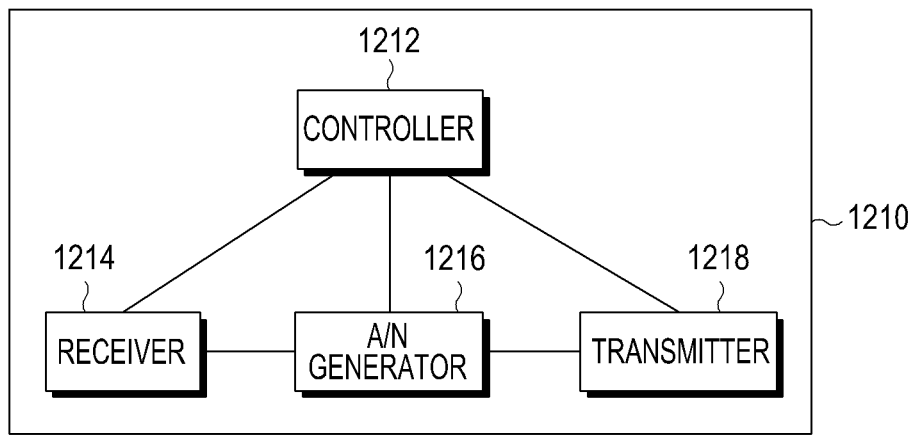
FIG. 12B is a block diagram of a member BS according to an exemplary embodiment of the present invention.

FIG. 12B is a block diagram of a member BS in a cooperative cell according to an exemplary embodiment of the present invention. The member BS may be a master BS or a slave BS.

Referring to FIG. 12B, a member BS 1210 includes a controller 1212, a receiver 1214, an A/N generator 1216, and a transmitter 1218.

In regard to a DL HARQ operation of the member BS 1210, the transmitter 1218 transmits data to an SS served by the cooperative cell.

In an exemplary embodiment of the present invention, if a master BS sets the member BS 1210 as an A/N receiving BS, the receiver 1214 receives a reception result signal for the data from the SS. The master BS may select a plurality of BSs to receive the reception result signal. The receiver 1214 receives the reception result signal from the SS. If the member BS 1210 is not set as an A/S receiving BS, the receiver 1214 awaits receipt of the reception result from at least one member BS set as an A/N receiving BS.

If the member BS 1210 controls retransmission, the controller 1212 determines whether to retransmit the data according to the reception result signal. If the controller 1212 determines that at least one same data as the data has been transmitted to the SS, the controller 1212 determines whether the reception result signal received at the receiver 1214 from the SS or at least one member BS set as an A/N receiving BS includes at least one ACK signal. If at least one ACK signal is included in the reception result signal, the controller 1212 does not perform retransmission of the data. On the other hand, if the reception result signal includes only NACK signals, the controller 1212 determines to perform retransmission of the data.

Meanwhile, if the controller 1212 determines that at least one data different from the data has been transmitted to the SS, the controller 1212 determines whether the receiver 1214 has received a NACK signal from the SS or at least one member BS set as an A/N receiving BS. If the receiver 1214 has received a NACK signal, the controller 1212 determines to perform retransmission of the data for which the NACK signal has been received.

In a case where the controller 1212 determines data retransmission, the controller 1212 selects at least one of the member BSs as an entity for performing the data retransmission and requests resource allocation for the retransmission to the selected BS. Upon receipt of the resource allocation request for the retransmission, the selected BS determines whether to accept the request through grant control and transmits a retransmission response including the determination result to the member BS 1210. The retransmission request includes at least one of the ID of the SS to which the data is to be retransmitted, the amount of retransmission data, and information about the QoS of the retransmission data. The retransmission response includes resource allocation information for the data retransmission.

If the determination result indicates 'accept' for the retransmission request, the BS that has acquired the determination result from the retransmission response confirms the BS as a BS that will allocate resources for the data retransmission and transmits a retransmission confirmation to the SS and the BS that has transmitted the retransmission request. Resource allocation information for the data retransmission is further transmitted to the SS.

If at least one of the at least one slave BS is an entity to perform the data retransmission, the controller 1212 determines whether the at least one BS has available resources for the data retransmission or counts the number of retransmission failures. The controller 1212 determines whether to transmit a retransmission control request according to the determination result or the count and transmits a retransmission control request to the master BS through the transmitter 1218. The master BS selects another BS for allocating resources for the data retransmission and the receiver 1214 receives a retransmission request response indicating that the retransmitting BS has been changed to one of the member BSs except for the member BS 1210 from the master BS.

In a case where the retransmitting BS is the master BS, if available resources are not sufficient for the retransmission or data transmission has failed at least a predefined number of times, the controller 1212 changes the retransmitting BS to a member BS other than the member BS 1210. The controller 1212 controls the transmitter 1218 to transmit a retransmission request to the member BS being the new retransmitting BS. When the receiver 1214 receives a retransmission response from the changed member BS, the controller 1212 determines to transmit resource allocation information for the retransmission to the changed member BS, if the retransmission response indicates 'accept' for the retransmission request, that is, that the retransmission is possible.

In regard to a UL HARQ operation of the member BS 1210, the receiver 1214 receives data from an SS. The controller 1212 determines the reception result of the data and controls the A/N generator 1216 to generate an A/N signal indicating the reception result. The transmitter 1218 determines whether the data should be retransmitted according to the A/N signal generated from the A/N generator 1216.

It is assumed that the SS 1200 has transmitted the same data to member BSs of the cooperative cell. If at least one ACK signal is generated for the same data received from the SS 1200, the controller 1212 determines not to perform data retransmission. If all NACK signals are generated for the same data, the controller 1212 determines to perform data retransmission.

On the other hand, if the SS 1200 has transmitted different data to the member BSs of the cooperative cell, the controller 1212 determines that only the data corresponding to the NACK signal should be retransmitted. Herein, it is assumed that retransmission of the data is determined. The controller then 1212 selects at least one of the member BSs as an entity to perform the data retransmission and transmits a retransmission request to the selected BS. The retransmission request includes at least one of the ID of the SS that will retransmit the data, the amount of the retransmission data, and information about the QoS of the retransmission data.

Upon receipt of the retransmission request, the BS determines whether to accept the retransmission request through grant control and transmits a retransmission response including the determination result to the BS that has transmitted the retransmission request. If the determination result indicates 'accept' for the retransmission request, the BS receiving the retransmission response confirms the BS transmitting the retransmission response as a BS to allocate resources for the data retransmission and transmits a retransmission confirmation including information about the BS to allocate resources for the data transmission to the BS transmitting the retransmission response and the SS. The BS receiving the retransmission response also transmits resource allocation information for the data retransmission to the SS.

If the retransmission entity is one of the at least one slave BS, the controller 1212 determines whether there are available resources for the data retransmission or counts the number of retransmission failures. The controller 1212 determines whether to transmit a retransmission control request according to the determination result or the count. The master BS selects another BS for allocating resources for the data retransmission and the receiver 1214 receives retransmission control information indicating that the retransmission entity has been changed to one of the member BSs except for the member BS 1210 from the master BS.

In a case where the retransmission entity is the master BS, if available resources are not sufficient for the retransmission or data transmission has failed at least a predefined number of times, the controller 1212 changes the retransmission entity to a member BS other than the member BS 1210. The controller 1212 controls the transmitter 1218 to transmit a retransmission request to the member BS being the new retransmission entity. When the receiver 1214 receives a retransmission response from the changed member BS, the controller 1212 determines to transmit resource allocation information for the retransmission to the changed member BS, if a determination result included in the retransmission response indicated 'accept' for the retransmission request, that is, that the retransmission is possible.

As is apparent from the above description of the present invention, a retransmitting BS and a BS to receive retransmission data are determined based on the transmission results of UL data and DL data and a specific procedure is performed according to the retransmitting BS and the BS to receive retransmission data in a cooperative cell-based communication system having a plurality of member BSs that provide a communication service to an SS in cooperation with one another. Therefore, time required for data retransmission is decreased and the radio resources of member BSs of the cooperative cell are efficiently used. In addition, the cooperative cell is reconfigured based on the data transmission result. Therefore, the accuracy and reliability of communication between the SS and the member BSs in the cooperative cell can be increased.

While the invention has been shown and described with reference to certain exemplary embodiments thereof, it will be understood by those skilled in the art that various changes in form and details may be made therein without departing from the spirit and scope of the present invention as defined by the appended claims and their equivalents.

What is claimed is:

1. A method for receiving data by a terminal in a communication system, the method comprising:
   receiving data from one of at least two base stations (BSs) providing a service to the terminal;
   generating a first response signal indicating a reception result of the data;
   transmitting, to a serving BS, the first response signal; and
   receiving data retransmitted from a first BS determined based on the first response signal by the serving BS among the at least two BSs,
   wherein the retransmitted data is received using a resource for data retransmission allocated by the serving BS after the serving BS receives a second response signal from the first BS.

2. The method of claim 1, wherein the generating comprises:
   when the data is received successfully from one BS of the at least two BSs to the terminal, the first response signal is generated as one ACK signal, and
   when the data is not received successfully from all of the at least two BSs to the terminal, the first response signal is generated as one NACK signal.

3. The method of claim 1, wherein, when different data is received from the at least two BSs, the first response signal indicates a reception result of data received from each of the at least two BSs.

4. The method of claim 1, wherein the first BS is determined by further considering at least one of a generation ratio of an ACK signal, a cell load, and a channel state by the serving BS.

5. A method for transmitting data by a serving base station (BS) in a communication system, the method comprising:
   transmitting data to a terminal;
   receiving, from the terminal, a first response signal indicating a reception result of data transmitted from at least two BSs to provide a service to the terminal;
   determining a first BS among the at least two BSs based on the first response signal;
   transmitting a request for data retransmission to the first BS; and
   allocating, when a second response signal of the request is received from the first BS, a resource for the data retransmission.

6. The method of claim 5, wherein the determining comprises:

receiving, from a second BS transmitting data corresponding to the reception result indicating a NACK signal, a control request for the data retransmission;
determining the first BS based on at least one of a generation ratio of ACK signal, a cell load, and a channel state; and
transmitting, to the first BS, a response of the control request comprising allocation information of the resource for the data retransmission.

7. The method of claim 5,
wherein, when the data is received successfully from one BS of the at least two BSs to the terminal, the first response signal is generated as one ACK signal, and
wherein, when the data is not received successfully from all of the at least two BSs to the terminal, the first response signal is generated as one NACK signal.

8. The method of claim 5, wherein, when different data is transmitted from the serving BS and the at least two BSs to the terminal, the first response signal indicates a reception result of the data received from each of the at least two BSs.

9. A method for transmitting data by an adjacent base station (BS) included in at least two BSs to provide a service to a terminal in a communication system, the method comprising:
transmitting data to the terminal;
receiving, from the terminal, a first response signal indicating a reception result of the data;
determining whether the adjacent BS performs data retransmission to the terminal based on the first response signal; and
transmitting, when a performance of the data retransmission is not determined, to a serving BS, a control request for the data retransmission,
wherein data retransmitted from a first BS determined by the serving BS among the at least two BSs is received by the terminal using a resource for the data retransmission allocated by the serving BS.

10. The method of claim 9, wherein the first BS is determined by further considering at least one of a generation ratio of an ACK signal, a cell load, and a channel state by the serving BS.

11. The method of claim 9,
wherein, when the data is received successfully from one BS of the at least two BSs to the terminal, the first response signal is generated as one ACK signal, and
wherein, when the data is not received successfully from all of the at least two BSs to the terminal, the first response signal is generated as one NACK signal.

12. The method of claim 9, wherein, when different data is transmitted from each of the at least two BSs to the terminal, the first response signal indicates a reception result of the data received from each of the at least two BSs.

13. A terminal for receiving data in a communication system, the terminal comprising:
a receiver configured to receive data from one of at least two base stations (BSs) providing a service to the terminal;
a controller configured to generate a first response signal indicating a reception result of the data; and
a transmitter configured to transmit the first response signal to a serving BS, and receive data retransmitted from a first BS determined based on the first response signal by the serving BS among the at least two BSs,
wherein the retransmitted data is received using a resource for data retransmission allocated by the serving BS after the serving BS receives a second response signal from the first BS.

14. The terminal of claim 13,
wherein, when the data is received successfully from one BS of the at least two BSs to the terminal, the first response signal is generated as one ACK signal, and
wherein, when the data is not received successfully from all of the at least two BSs to the terminal, the first response signal is generated as one NACK signal.

15. The terminal of claim 13, wherein, when different data is received from the at least two BSs, the first response signal indicates a reception result of data received from each of at least two BSs.

16. The terminal of claim 13, wherein the first BS is determined by further considering at least one of a generation ratio of an ACK signal, a cell load, and a channel state.

17. A serving base station (BS) for transmitting data in a communication system, the serving BS comprising:
a transceiver configured to transmit data to a terminal and receive, from the terminal, a first response signal indicating a reception result of data transmitted from at least two BSs to provide a service to the terminal; and
a controller configured to:
determine a first BS among the at least two BSs based on the first response signal,
control the transceiver to transmit a request for data retransmission to the first BS, and
allocate, when a second response signal of the request is received from the first BS, a resource for the data retransmission.

18. The serving BS of claim 17,
wherein the transceiver is further configured to receive, from a second BS transmitting data corresponding to the reception result indicating a NACK signal, a control request for the data retransmission,
wherein the controller is further configured to determine the first BS based on at least one of a generation ratio of ACK signal, a cell load, and a channel state, and
wherein the transmitter is further configured to transmit, to the first BS, a response of the control request comprising allocation information of the resource for the data retransmission.

19. The serving BS of claim 17,
wherein, when the data is received successfully from one BS of the at least two BSs to the terminal, the first response signal is generated as one ACK signal, and
wherein, when the data is not received successfully from all of the at least two BSs to the terminal, the first response signal is generated as one NACK signal.

20. The serving BS of claim 17, wherein, when different data is transmitted from the serving BS and the at least two BSs to the terminal, the first response signal indicates a reception result of the data received from each of at least two BSs.

21. An adjacent base station (BS) included in at least two BSs to provide a service to a terminal in a communication system, the adjacent BS comprising:
a transceiver configured to transmit data to the terminal and receive, from the terminal, a first response signal indicating a reception result of the data; and
a controller configured to:
determine whether the adjacent BS performs data retransmission to the terminal based on the first response signal, and
control the transceiver to transmit, when a performance of the data retransmission is not determined, a control request for the data retransmission to a serving BS, wherein data retransmitted from a first BS determined by the serving BS among the at least two BSs is received by the terminal using a resource for data retransmission allocated by the serving BS.

22. The adjacent BS of claim 21, wherein the first BS is determined by further considering at least one of a generation ratio of an ACK signal, a cell load, and a channel state by the serving BS.

23. The adjacent BS of claim 21,
wherein, when the data is received successfully from one BS of the at least two BSs to the terminal, the first response signal is generated as one ACK signal, and
wherein, when the data is not received successfully from all of the at least two BSs to the terminal, the first response signal is generated as one NACK signal.

24. The adjacent BS claim 21, wherein, when different data is transmitted from each of the at least two BSs to the terminal, the first response signal indicates a reception result of the data received from each of at least two BSs.

* * * * *